(12) United States Patent
Tsunoda et al.

(10) Patent No.: US 7,625,657 B2
(45) Date of Patent: Dec. 1, 2009

(54) FUEL CELL AND FUEL CELL STACK

(75) Inventors: Tadashi Tsunoda, Nerima-ku (JP);
Masahiko Izumi, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 236 days.

(21) Appl. No.: 11/016,620

(22) Filed: Dec. 17, 2004

(65) Prior Publication Data

US 2005/0136316 A1    Jun. 23, 2005

(30) Foreign Application Priority Data

Dec. 17, 2003    (JP)    ............................. 2003-419909

(51) Int. Cl.
*H01M 8/04*    (2006.01)

(52) U.S. Cl. ............................. 429/37; 429/38; 429/39

(58) Field of Classification Search ........................ None
See application file for complete search history.

(56) References Cited

U.S. PATENT DOCUMENTS

| | | | |
|---|---|---|---|
| 5,532,073 A | | 7/1996 | Hirata et al. |
| 5,770,327 A | * | 6/1998 | Barnett et al. ................. 429/32 |
| 6,344,290 B1 | | 2/2002 | Bossel et al. |
| 2003/0134174 A1 | * | 7/2003 | Akikusa et al. ............... 429/38 |
| 2005/0221161 A1 | | 10/2005 | Komada et al. |
| 2007/0092775 A1 | | 4/2007 | Komada et al. |

FOREIGN PATENT DOCUMENTS

| | | |
|---|---|---|
| JP | 7-201353 | 8/1995 |
| JP | 10-241707 | 9/1998 |
| JP | 11-016581 | 1/1999 |
| JP | 2000-164230 | 6/2000 |
| JP | 2002-203579 | 7/2002 |
| JP | 2002-313370 | * 10/2002 |
| JP | 2003-168469 | 6/2003 |
| WO | WO-03/075384 A1 | 9/2003 |

OTHER PUBLICATIONS

Machine translation of JP 11-016581, Jan. 1999.*
International Search Report for Application No. PCT/JP2004/019275, dated Mar. 6, 2006.
Japanese Office Action for Application No. 2003-419909, dated Feb. 26, 2008.
European Search Report for Application No. 08017148.1, dated Feb. 18, 2009.

* cited by examiner

*Primary Examiner*—Jonathan Crepeau
(74) *Attorney, Agent, or Firm*—Lahive & Cockfield, LLP; Anthony A. Laurentano

(57) ABSTRACT

A fuel cell includes an electrolyte electrode assembly and separators. The separator has a fuel gas supply passage, a fuel gas distribution passage, an oxygen-containing gas supply passage, and an oxygen-containing gas distribution passage. The fuel gas flows through the fuel gas supply passage into the separator. The fuel gas distribution passage connects the fuel gas channel and the fuel gas supply passage. The oxygen-containing gas flows through the oxygen-containing gas supply passage into the separator. The oxygen-containing gas distribution passage connects the oxygen-containing gas channel and the oxygen-containing gas supply passage.

8 Claims, 22 Drawing Sheets

⇨ OXYGEN-CONTAINING GAS
⇨ FUEL GAS
⇨ EXHAUST GAS

---> FUEL GAS
——> OXYGEN-CONTAINING GAS

⇨ OXYGEN-CONTAINING GAS
⇨ FUEL GAS
⇨ EXHAUST GAS

---→ FUEL GAS
——→ OXYGEN-CONTAINING GAS

FUEL CELL AND FUEL CELL STACK

BACKGROUND OF THE INVENTION

1. Field of the Invention

The present invention relates to a fuel cell formed by stacking an electrolyte electrode assembly and separators alternately. The electrolyte electrode assembly includes an anode, a cathode, and an electrolyte interposed between the anode and the cathode. Further, the present invention relates to a fuel cell stack formed by stacking a plurality of fuel cells.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, a predetermined numbers of the unit cells and the separators are stacked together to form a fuel cell stack.

In the fuel cell, an oxygen-containing gas or air is supplied to the cathode. The oxygen in the oxygen-containing gas is ionized at the interface between the cathode and the electrolyte, and the oxygen ions ($O^{2-}$) move toward the anode through the electrolyte. A fuel gas such as a hydrogen-containing gas or CO is supplied to the anode. Oxygen ions react with the hydrogen in the hydrogen-containing gas to produce water or react with CO to produce $CO_2$. Electrons released in the reaction flow through an external circuit to the cathode, creating a DC electric energy.

Some of the fuel cell stacks of this type formed by stacking a plurality of fuel cells are known from, for example, Japanese Laid-Open Patent Publication No. 2002-203579, which discloses a solid oxide fuel cell. As shown FIG. 21, the solid oxide fuel cell is formed by stacking power generation cells 1 and separators 2 alternately. Each of the power generation cells 1 includes a fuel electrode layer 1b, an air electrode layer 1c, and a solid electrolyte layer 1a interposed between the fuel electrode layer 1b and the air electrode layer 1c. A porous conductive fuel electrode current collector 3 is provided on one surface of the power generation cell 1, and a porous conductive air electrode current collector 4 is provided on the other surface of the power generation cell 1. The fuel electrode current collector 3, the power generation cell 1, and the air electrode current collector 4 are sandwiched between a pair of separators 2.

The separator 2 has a fuel gas supply passage 5 and an air supply passage 6. The fuel gas supply passage 5 is connected to a fuel gas hole 5a formed at a substantially central region on one surface of the separator 2. The air supply passage 6 is connected to an air hole 6a formed at a substantially central region on the other surface of the separator 2. The fuel gas hole 5a faces the fuel electrode current collector 3. The air hole 6a faces the air electrode current collector 4.

The fuel gas such as $H_2$ or CO flows through the fuel gas supply passage 5, and is discharged from the substantially central region of the separator 2 toward the center of the fuel electrode current collector 3. The fuel gas flows through holes formed in the fuel electrode current collector 3 toward the substantially central region of the fuel electrode layer 1b. Then, the fuel gas flows along unillustrated slits to move radially outwardly toward the outer region of the fuel electrode layer 1b.

Likewise, the air is supplied from the substantially central region of the separator 2 toward the center of the air electrode current collector 4 through the air supply passage 6. The air flows through holes formed in the air electrode current collector 4 toward the substantially central region of the air electrode layer 1c. Then, the air flows along unillustrated slits to move radially outwardly toward the outer region of the air electrode layer 1c. In this manner, in each of the power generation cells 1, the fuel gas is supplied to the surface of the fuel electrode layer 1b, and the air is supplied to the surface of the air electrode layer 1c to carry out power generation.

When a large number of power generation cells 1 and separators 2 are stacked together as described above, it is necessary to apply a uniform load (pressure) to each of the power generation cells 1. It is desirable to achieve the uniform surface pressure, high performance, and long service life. For these purposes, for example, a fuel cell disclosed in Japanese Laid-Open Patent Publication No. 10-241707 is known.

As shown in FIG. 22, according to the disclosure of Japanese Laid-Open Patent Publication No. 10-241707, a power generation cell 7 is sandwiched between a pair of separators 8. The power generation cell 7 includes an electrode plate 7a and electrolyte plates 7b, 7c provided on both surfaces of the electrode plate 7a. A pair of current collector plates 7d are stacked on the outside of the electrode plates 7b, 7c. The separator 8 includes a partition plate 8a, a current collector corrugated plate 8b, a seal frame 8c, and a support frame 8d. When a tightening pressure is applied to the surface of the fuel cell stack during operation of the fuel cell stack, the support frame 8d and the current collector corrugated plate 8b are deformed elastically to substantially the same extent.

However, according to the disclosure of Japanese Laid-Open Patent Publication No. 10-241707, when a tightening load is applied to the seal member to achieve the desired sealing performance, an excessive load may be applied to the electrolyte electrode assembly undesirably, and the electrolyte electrode assembly may be damaged. Further, since the separator 8 includes the partition plate 8a, the current collector corrugated plate 8b, the seal frame 8c, and the support frame 8d, the structure of the separator 8 is complicated, the separator 8 is expensive, and the thickness of the separator 8 is considerably large. Therefore, the power generation capacity per unit volume of the fuel cell stack is low. The number of processes required for producing the fuel cell stack is increased, and the production cost of the fuel cell stack is high.

SUMMARY OF THE INVENTION

A general object of the present invention is to provide a fuel cell and a fuel cell stack having a simple and economical structure in which the desired tightening load is applied reliably, and the sealing performance is improved.

According to the present invention, an electrolyte electrode assembly and separators are stacked alternately, and the electrolyte electrode assembly includes an anode, a cathode, and an electrolyte interposed between the anode and the cathode. A fuel gas flow field for supplying a fuel gas along a surface of the anode, and an oxygen-containing gas flow field for supplying an oxygen-containing gas along a surface of the cathode are formed.

The separator comprises a fuel gas supply unit for allowing the fuel gas to flow into a surface of the separator, a fuel gas distribution passage connecting the fuel gas flow field and the fuel gas supply unit, an oxygen-containing gas supply unit for allowing the oxygen-containing gas to flow into a surface of the separator, and an oxygen-containing gas distribution passage connecting the oxygen-containing gas flow field and the oxygen-containing gas supply unit. Tightening means is provided at positions closer to the fuel gas supply unit and the oxygen-containing gas supply unit than the electrolyte electrode assembly for applying a tightening load to the stack of the electrolyte electrode assembly and the separators in the stacking direction.

It is preferable that the separator comprises an electrode stack unit on which the electrolyte electrode assembly is stacked, a first bridge connecting the electrode stack unit and the fuel gas supply unit to form the fuel gas distribution passage, and a second bridge connecting the electrode stack unit and the oxygen-containing gas supply unit to form the oxygen-containing gas distribution passage.

Further, it is preferable that the separator includes first and second plates which are stacked together, and a third plate interposed between the first and second plates. The fuel gas flow field is formed between the first plate and one electrolyte electrode assembly, and the oxygen-containing gas flow field is formed between the second plate and another electrolyte electrode assembly. A space in the separator is divided by the third plate into a fuel gas channel connecting the fuel gas supply unit and the fuel gas flow field and an oxygen-containing gas channel connecting the oxygen-containing gas supply unit and the oxygen-containing gas flow field.

Further, it is preferable that the fuel gas supply unit comprises a fuel gas supply passage extending through the electrolyte electrode assembly and the separators in the stacking direction.

Further, according to the present invention, a fuel cell stack is formed by stacking a plurality of fuel cells. Each of the fuel cells is formed by stacking an electrolyte electrode assembly and separators alternately. The electrolyte electrode assembly includes an anode, a cathode, and an electrolyte interposed between the anode and the cathode. A fuel gas flow field for supplying a fuel gas along a surface of the anode, and an oxygen-containing gas flow field for supplying an oxygen-containing gas along a surface of the cathode are provided.

The separator comprises a fuel gas supply unit for allowing the fuel gas to flow into a surface of the separator, a fuel gas distribution passage connecting the fuel gas flow field and the fuel gas supply unit, an oxygen-containing gas supply unit for allowing the oxygen-containing gas to flow into a surface of the separator, and an oxygen-containing gas distribution passage connecting the oxygen-containing gas flow field and the oxygen-containing gas supply unit. Tightening means is provided at positions closer to the fuel gas supply unit and the oxygen-containing gas supply unit than the electrolyte electrode assembly for applying a tightening load to the stack of the electrolyte electrode assembly and the separators in the stacking direction.

Since the rigidity of the fuel gas supply unit, the rigidity of the electrode stack unit, and the rigidity of the oxygen-containing gas supply unit are separated by the bridges, the tightening loads applied to the respective positions of the separator can be determined individually. It is possible to apply the load preferentially to position where the sealing function is required. With the simple and economical structure, sealing performance is improved desirably, and no excessive load is applied to the electrolyte electrode assemblies. Therefore, the damage of the electrolyte electrode assemblies is prevented effectively.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
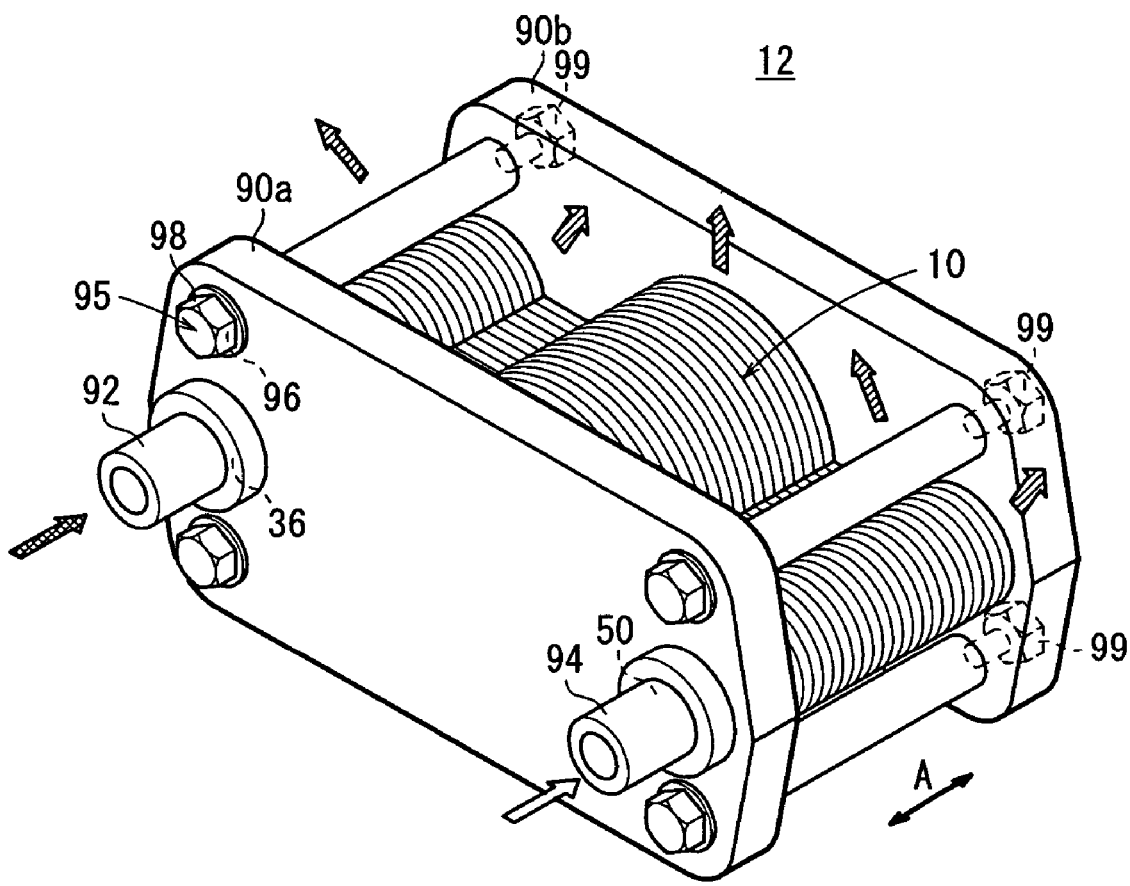
FIG. 1 is a perspective view schematically showing a fuel cell stack formed by stacking a plurality of fuel cells according to a first embodiment of the present invention.

FIG. 1 is a perspective view schematically showing a fuel cell stack 12 formed by stacking a plurality of fuel cells 10 according to a first embodiment of the present invention in a direction indicated by an arrow A.

Figure 2:
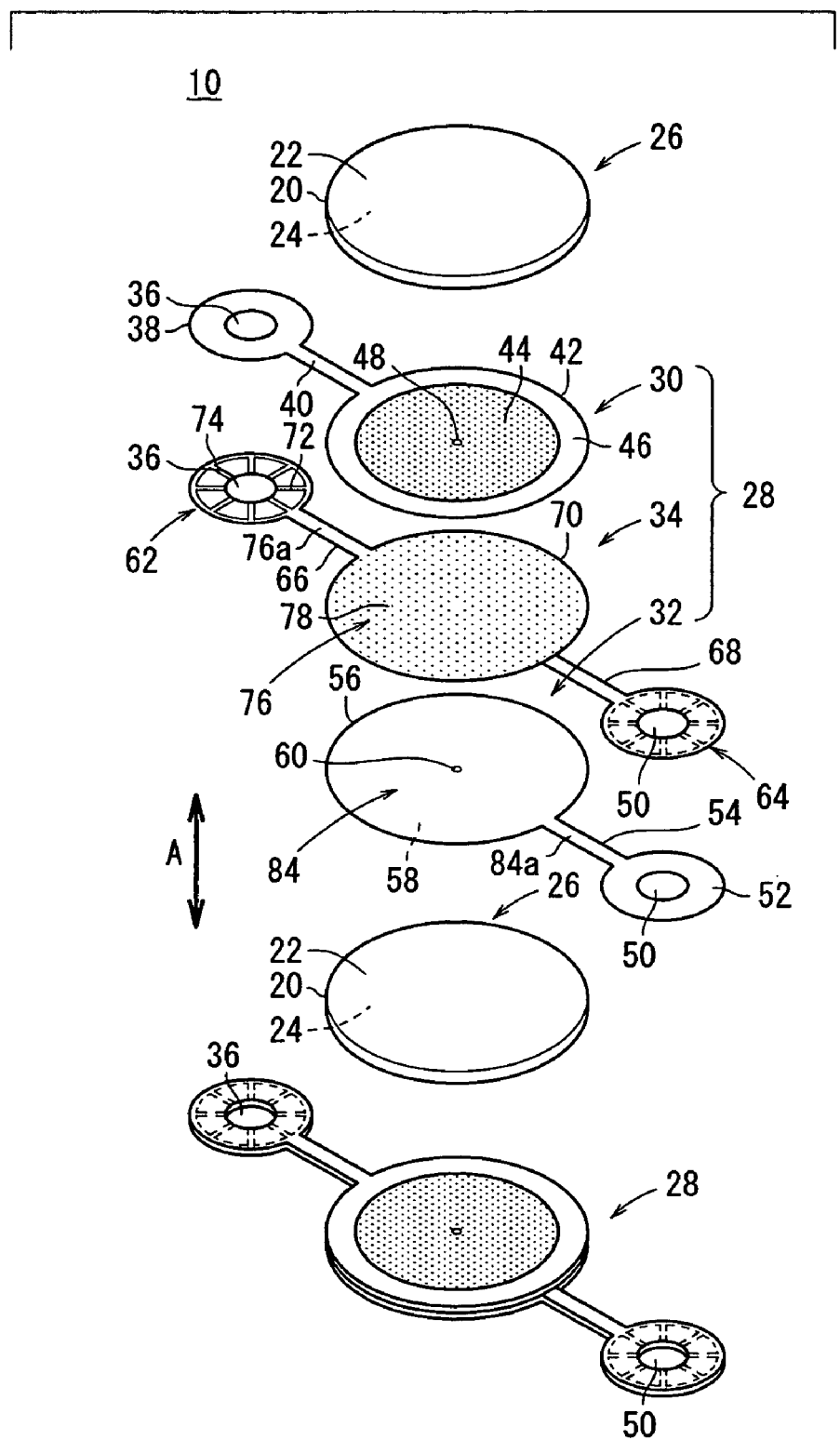
FIG. 2 is an exploded perspective view showing the fuel cell.
Figure 3:
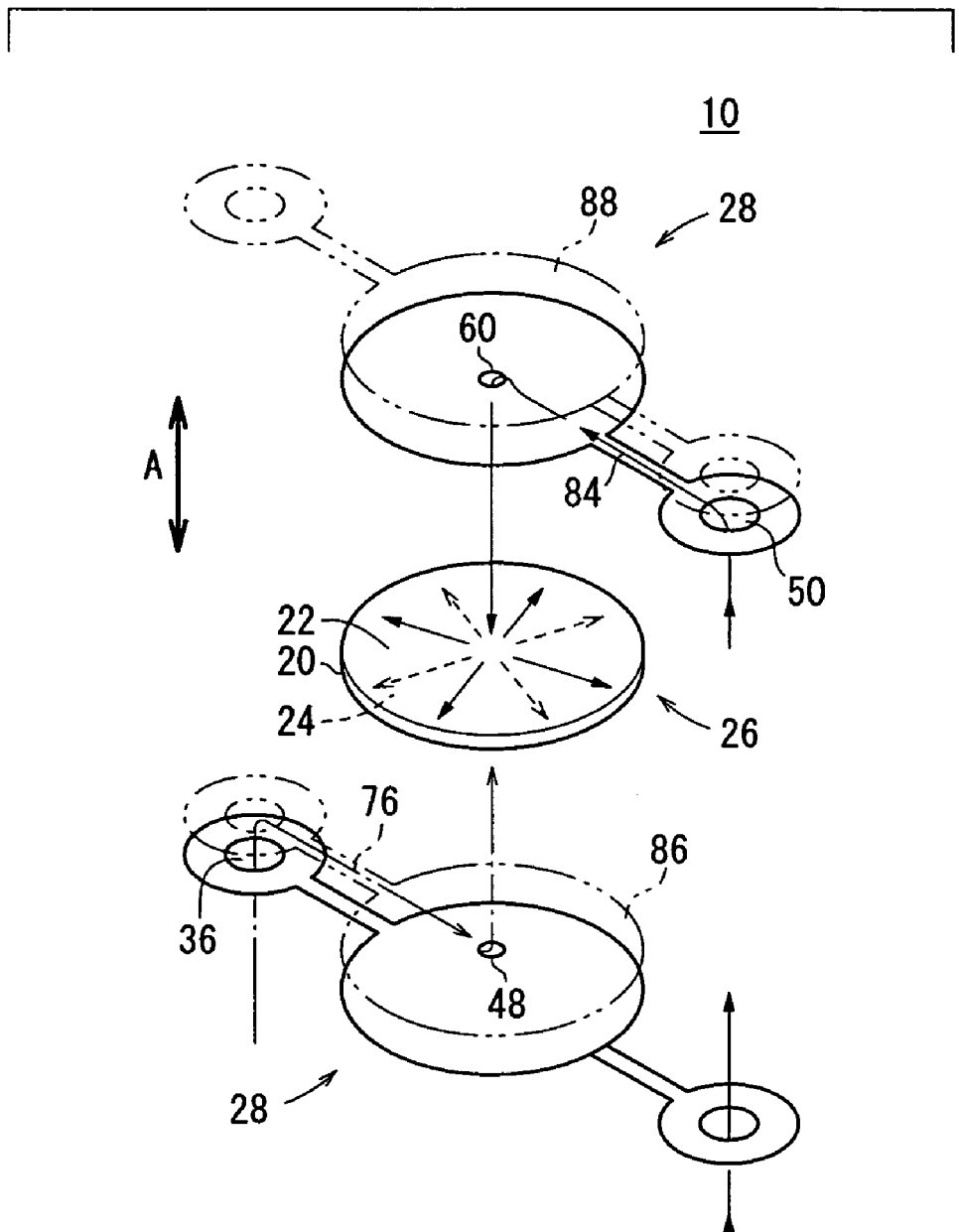
FIG. 3 is a partial exploded perspective view showing gas flows in the fuel cell.

The fuel cell 10 is a solid oxide fuel cell (SOFC) used in various applications, including stationary and mobile applications. The fuel cell 10 is mounted on a vehicle. As shown in FIGS. 2 and 3, the fuel cell 10 includes an electrolyte electrode assembly 26. The electrolyte electrode assembly 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape.

The fuel cell 10 is formed by sandwiching the electrolyte electrode assembly 26 between a pair of separators 28. The separator 28 includes first and second plates 30, 32, and a third plate 34 interposed between the first and second plates 30, 32. For example, the first through third plates 30, 32, 34 are metal plates of, e.g., stainless alloy. The first plate 30 and the second plate 32 are joined to both surfaces of the third plate 34 by brazing, for example.

As shown in FIG. 2, the first plate 30 has a first small diameter end portion (a fuel gas supply unit) 38. A fuel gas supply passage 36 for supplying a fuel gas in the direction indicated by the arrow A extends through the first small diameter end portion 38. The first small diameter end portion 38 is integral with a first circular disk 42 having a relatively large diameter through a narrow first bridge 40. The first circular disk 42 and the anode 24 of the electrolyte electrode assembly 26 have substantially the same size.

A large number of first protrusions 44 are formed on a surface of the first circular disk 42 which contacts the anode 24, in a central region adjacent to an outer circumferential region. A substantially ring shaped protrusion 46 is provided on the outer circumferential region of the first circular disk 42. A fuel gas flow field is provided between the first protrusions 44 and the anode 24. The first protrusions 44 and the substantially ring shaped protrusion 46 jointly functions as a current collector. A fuel gas inlet 48 is provided at the center of the first circular disk 42 for supplying the fuel gas toward substantially the central region of the anode 24. The first protrusions 44 may be formed by making a plurality of recesses in a surface which is in the same plane with the surface of the substantially ring shaped protrusion 46.

The second plate 32 has a second small diameter end portion (an oxygen-containing gas supply unit) 52. An oxygen-containing gas supply passage 50 for supplying an oxygen-containing gas in the direction indicated by the arrow A extends through the second small diameter end portion 52. The second small diameter end portion 52 is integral with a second circular disk 56 having a relatively large diameter through a narrow second bridge 54.

Figure 4:
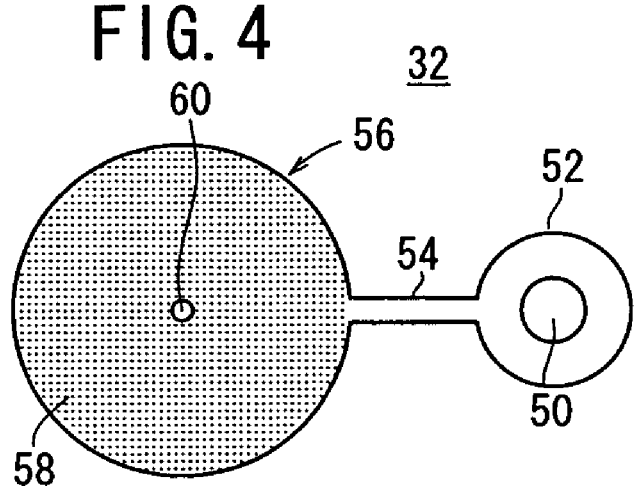
FIG. 4 is a front view showing a second plate of the fuel cell.

As shown in FIG. 4, a plurality of second protrusions 58 are formed on the entire surface of the second circular disk 56 which contacts the cathode 22 of the electrolyte electrode assembly 26. An oxygen-containing gas flow field is provided between the second protrusions 58 and the cathode 22, and the second protrusions 58 function as a current collector. An oxygen-containing gas inlet 60 is provided at the center of the second circular disk 56 for supplying the oxygen-containing gas toward substantially the central region of the cathode 22.

As shown in FIG. 2, the third plate 34 includes a third small diameter end portion (the fuel gas supply unit) 62 and a fourth small diameter end portion (the oxygen-containing gas supply unit) 64. The fuel gas supply passage 36 extends through the third small diameter end portion 62, and the oxygen-containing gas supply passage 50 extends through the fourth small diameter end portion 64. The third and fourth small diameter end portions 62, 64 are integral with a third circular disk 70 having a relatively large diameter through narrow first and second bridges 66, 68, respectively. The first through third circular disks 42, 56, 70 have the same diameter.

Figure 5:
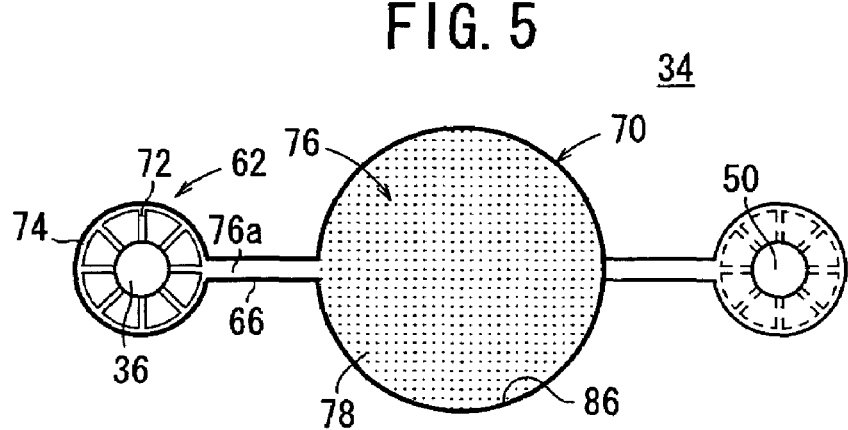
FIG. 5 is a view, with partial omission, showing one surface of a third plate of the fuel cell.

As shown in FIGS. 2 and 5, the third plate 34 has a plurality of slits 72 radially formed in the third small diameter end portion 62, on a surface facing the first plate 30. The slits 72 are connected to the fuel gas supply passage 36. Further, the slits 72 are connected to a recess 74 formed in an outer circumferential region of the third small diameter end portion 62. The recess 74 prevents the entry of brazing material into the slits 72, and into an area inside the recess 74. A fuel gas channel 76 is formed in the first bridge 66 and in the surface of the third circular disk 70. The fuel gas flows from the fuel gas supply passage 36 to the fuel gas channel 76 through the slits 72. A plurality of third protrusions 78 are formed on the third circular disk 70, and the third protrusions 78 are part of the fuel gas channel 76.

Figure 6:
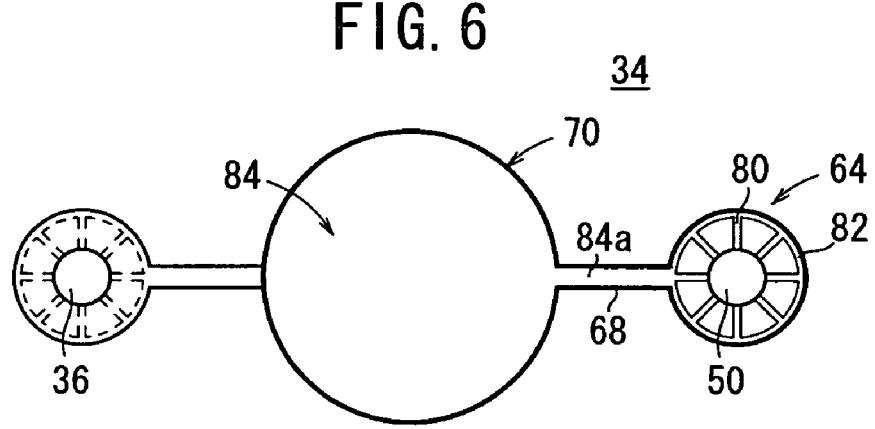
FIG. 6 is a view, with partial omission, showing the other surface of the third plate.

As shown in FIG. 6, the third plate 34 has a plurality of slits 80 radially formed in the fourth small diameter end portion 64, on a surface which contacts the second plate 32. The slits 80 are connected to the oxygen-containing gas supply passage 50. Further, the slits 80 are connected to a recess 82. The recess 82 prevents the entry of brazing material into slits 80, and into an area inside the recess 82. An oxygen-containing gas channel 84 is formed in the third circular disk 70. The oxygen-containing gas flows through the slits 80 into the third circular disk 70. The oxygen-containing gas channel 84 is closed by the outer circumferential region of the third circular disk 70.

The first plate 30 is joined to one surface of the third plate 34 by brazing to form the fuel gas channel 76 connected to the fuel gas supply passage 36 between the first and third plates 30, 34. The first bridge 40 of the first plate 30 and the first bridge 66 of the third plate 34 are joined together to form a fuel gas channel member, and a fuel gas distribution passage 76a as part of the fuel gas channel 76 is formed in the fuel gas channel member (see FIG. 7).

The fuel gas channel 76 is provided between the first and third circular disks 42, 70, over the electrode surface of the anode 24. The first circular disk 42 is provided between the fuel gas channel 76 and the anode 24, and the fuel gas is supplied to the fuel gas channel 76. That is, a fuel gas pressure chamber 86 is formed such that the first circular disk 42 tightly contacts the anode 24 under pressure (see FIGS. 7 and 8).

Figure 8:
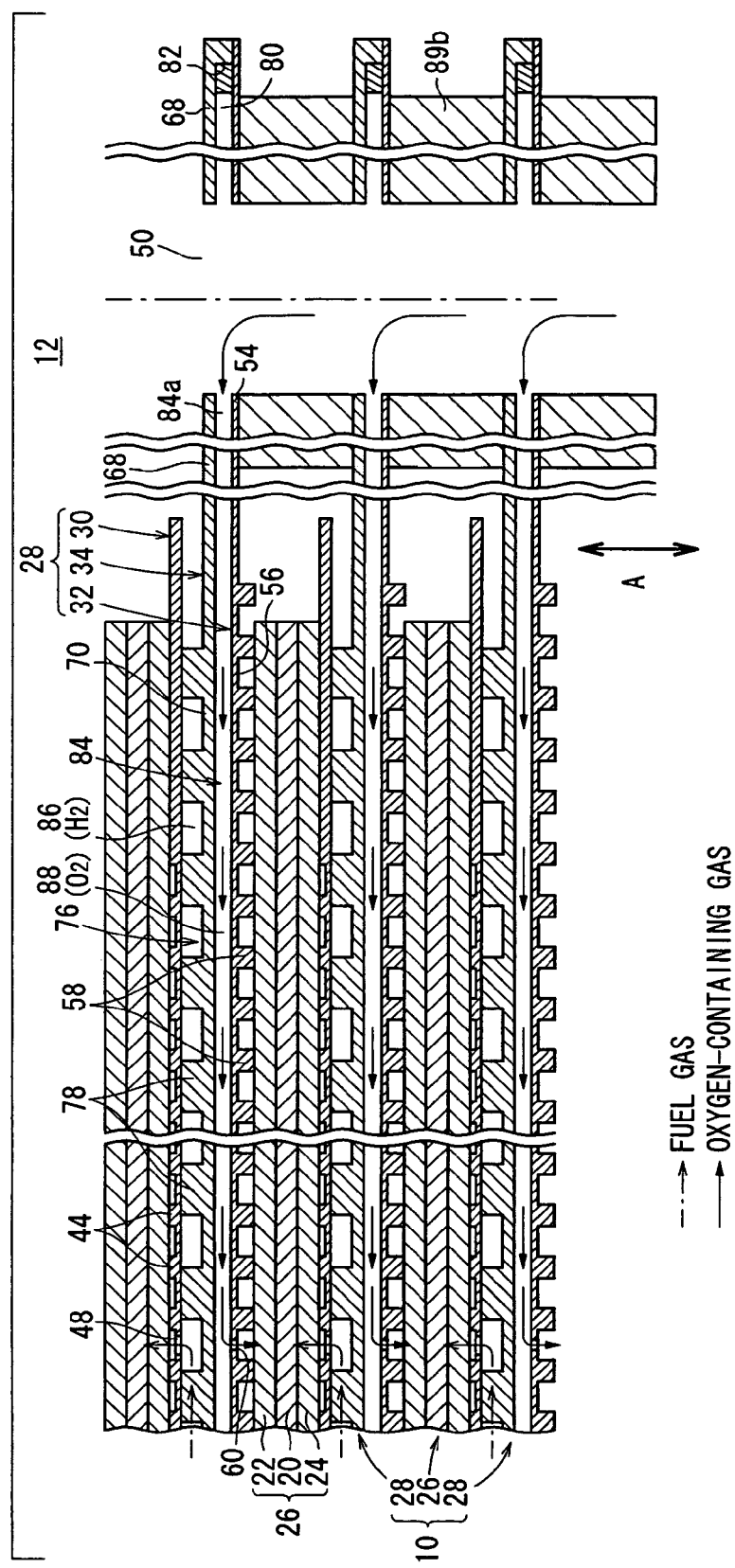
FIG. 8 is an enlarged cross sectional view showing a region near an oxygen-containing gas supply passage of the fuel cell.

The second plate 32 is joined to the third plate 34 by brazing to form the oxygen-containing gas channel 84 connected to the oxygen-containing gas supply passage 50 between the second and third plates 32, 34 (see FIG. 8). The second bridge 54 of the second plate 32 and the second bridge 68 of the third plate 34 are joined together to form an oxygen-containing gas channel member, and an oxygen-containing gas distribution passage 84a as part of the oxygen-containing gas channel 84 is formed in the oxygen-containing gas channel member.

The oxygen-containing gas channel 84 is provided between the second and third circular disks 56, 70, over the electrode surface of the cathode 22. The second circular disk 56 is provided between the oxygen-containing gas channel 84 and the cathode 22, and the oxygen-containing gas is supplied to the oxygen-containing gas channel 84. That is, an oxygen-containing gas pressure chamber 88 is formed such that the second circular disk 56 tightly contacts the cathode 22 under pressure (see FIGS. 7 and 8).

Insulating seals 89a for sealing the fuel gas supply passage 36 and insulating seals 89b for sealing the oxygen-containing gas supply passage 50 are provided between the separators 28. For example, the insulating seals 89a, 89b are made of mica material, or ceramic material.

As shown in FIG. 1, the fuel cell stack 12 includes end plates 90a, 90b provided at opposite ends of the fuel cells 10 in the stacking direction. The end plate 90a or the end plate 90b is electrically insulated from tightening means 95. A first pipe 92 and a second pipe 94 extend through the end plate 90a. The first pipe 92 is connected to the fuel gas supply passage 36 of the fuel cell 10, and the second pipe 94 is connected to the oxygen-containing gas supply passage 50 of the fuel cell 10. The tightening means 95 applies a tightening load to the electrolyte electrode assemblies 26 and the separators 28 stacked in the direction indicated by the arrow A. The tightening means 95 is provided at positions closer to the fuel gas supply passage 36 and the oxygen-containing gas supply passage 50 than the electrolyte electrode assemblies 26.

The tightening means 95 includes bolt holes 96 of the end plates 90a, 90b. The fuel gas supply passage 36 and the oxygen-containing gas supply passage 50 are positioned between the bolt holes 96, respectively. Tightening bolts 98 are inserted into the respective bolt holes 96, and tip ends of the respective tightening bolts 98 are screwed into nuts 99 for tightening the fuel cell stack 12.

Next, operation of the fuel cell stack 12 will be described below.

As shown in FIG. 2, in assembling the fuel cell 10, firstly, the first plate 30 of the separator 28 is joined to one surface of the third plate 34, and the second plate 32 is joined to the other surface of the third plate 34. Thus, the third plate 34 divides a space in the separator 28 to form the fuel gas channel 76 connected to the fuel gas supply passage 36 and the oxygen-containing gas channel 84 connected to the oxygen-containing gas supply passage 50 separately (see FIG. 3).

Figure 9:
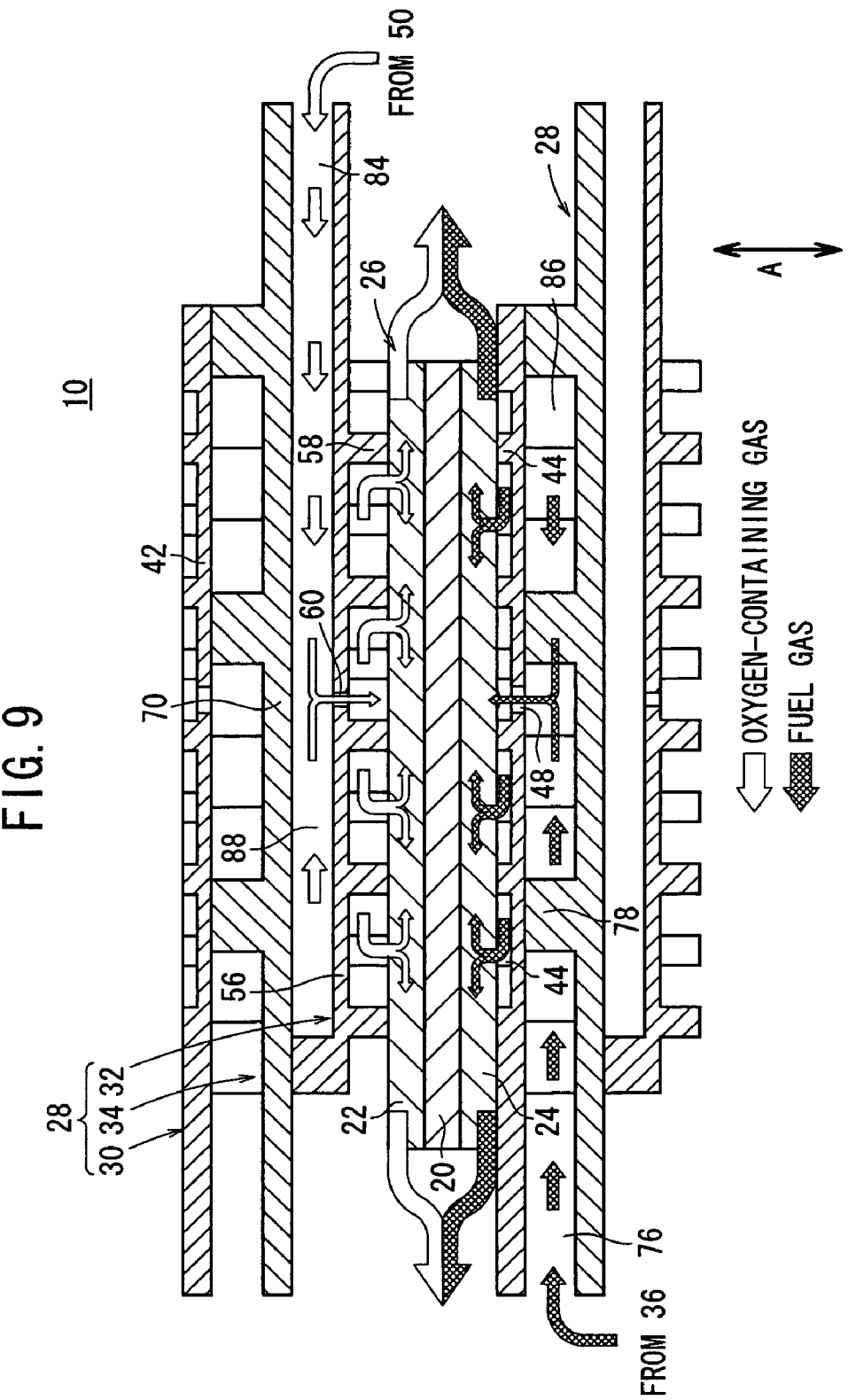
FIG. 9 is a cross sectional view schematically showing operation of the fuel cell.

Further, the fuel gas pressure chamber 86 is formed between the first and third circular disks 42, 70, and the oxygen-containing gas pressure chamber 88 is formed between the second and third circular disks 56, 70 (see FIG. 9).

Then, the separators 28 and the electrolyte electrode assemblies 26 are stacked alternately, and the end plates 90a, 90b are provided at the opposite ends in the stacking direction. The end plate 90a or the end plate 90b is electrically insulated from the tightening bolts 98. The tightening bolts 98 are inserted into the respective bolt holes 96 of the end plates 90a, 90b, and the tip ends of the tightening bolts 98 are screwed into the nuts 99. That is, the stacked separators 28 and the electrolyte electrode assemblies 26 are tightened together by the tightening means 95 to form the fuel cell stack 12 (see FIG. 1).

A fuel gas (e.g., hydrogen-containing gas) is supplied to the first pipe 92 connected to the end plate 90a, and the fuel gas flows from the first pipe 92 to the fuel gas supply passage 36. An oxygen-containing gas (hereinafter also referred to as the air) is supplied to the second pipe 94 connected to the end plate 90a, and the oxygen-containing gas flows from the second pipe 94 to the oxygen-containing gas supply passage 50.

Figure 7:
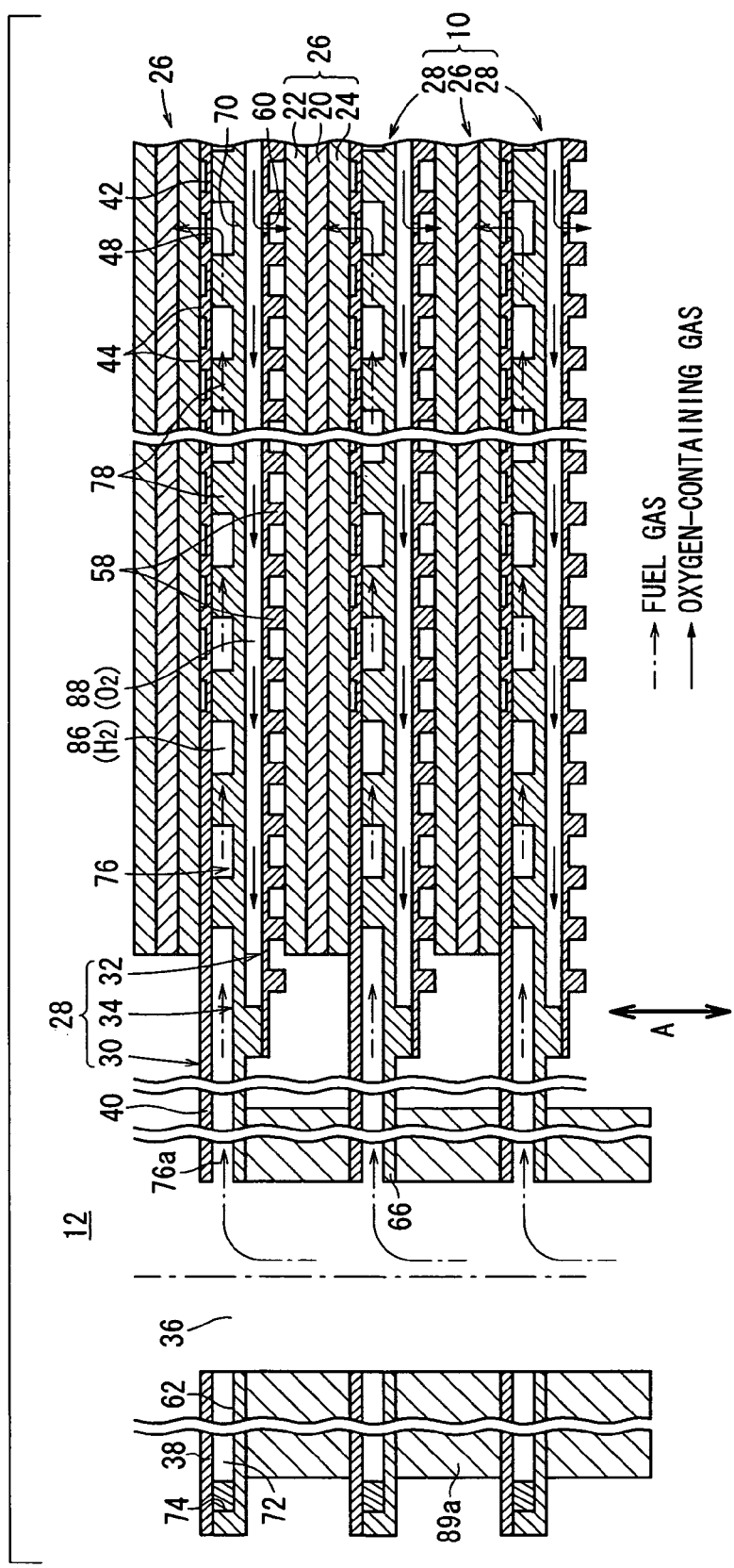
FIG. 7 is an enlarged cross sectional view showing a region near a fuel gas supply passage of the fuel cell.

As shown in FIG. 7, after the fuel gas flows into the fuel gas supply passage 36, the fuel gas flows in the stacking direction indicated by the arrow A, and is supplied to the fuel gas channel 76 in the separator 28 in each of the fuel cells 10. The fuel gas flows along the fuel gas channel 76, and flows into the fuel gas pressure chamber 86 between the first and third circular disks 42, 70. The fuel gas flows between the third protrusions 78, and flows into the fuel gas inlet 48 at the central position of the first circular disk 42.

The fuel gas inlet 48 is provided at a position corresponding to the central position of the anode 24 in each of the electrolyte electrode assemblies 26. Therefore, as shown in FIG. 9, the fuel gas from the fuel gas inlet 48 is supplied to the anode 24, and flows from the central region of the anode 24 toward the outer circumferential region of the anode 24.

As shown in FIG. 8, after the oxygen-containing gas flows into the oxygen-containing gas supply passage 50, the oxygen-containing gas flows through the oxygen-containing gas channel 84 in the separator 28, and is supplied to the oxygen-containing gas pressure chamber 88 between the second and third circular disks 56, 70. The oxygen-containing gas flows into the oxygen-containing gas inlet 60 at the central position of the second circular disk 56.

The oxygen-containing gas inlet 60 is provided at a position corresponding to the central position of the cathode 22 in each of the electrolyte electrode assemblies 26. Therefore, as shown in FIG. 9, the oxygen-containing gas from the oxygen-containing gas inlet 60 is supplied to the cathode 22, and flows from the central region of the cathode 22 to the outer circumferential region of the cathode 22.

Thus, in each of the electrolyte electrode assemblies 26, the fuel gas is supplied from the central region of the anode 24 to the outer circumferential region of the anode 24, and the oxygen-containing gas is supplied from the central region of the cathode 22 to the outer circumferential region of the cathode 22 for generating electricity. After the fuel gas and the oxygen-containing gas are consumed in the power generation, the fuel gas and the oxygen-containing gas are discharged as an exhaust gas from the outer circumferential regions of the first through third circular disks 42, 56, and 70.

In the first embodiment, the separator 28 has the fuel gas supply passage 36, the fuel gas distribution passage 76a, the oxygen-containing gas supply passage 50, and the oxygen-containing gas distribution passage 84a. The fuel gas flows through the fuel gas supply passage 36 into the surface of the separator 28. The fuel gas distribution passage 76a connects the fuel gas channel 76 and the fuel gas supply passage 36. The oxygen-containing gas flows through the oxygen-containing gas supply passage 50 into the surface of the separator 28. The oxygen-containing gas distribution passage 84a connects the oxygen-containing gas channel 84 and the oxygen-containing gas supply passage 50.

Specifically, the first and third small diameter end portions 38, 62 (fuel gas supply passage 36) and the first and third circular disks 42, 70 (fuel gas channel 76) are connected by the narrow first bridges 40, 66 (fuel gas distribution passage 76a), and the second and fourth small diameter end portions 52, 64 (oxygen-containing gas supply passage 50) and the second and third circular disks 56, 70 (oxygen-containing gas channel 84) are connected by the narrow second bridges 54, 68 (oxygen-containing gas distribution passage 84a).

In the separator 28, the rigidity of a fuel gas supply unit, the rigidity of an electrode stack unit, and the rigidity of an oxygen-containing gas supply unit are separated by the bridges. Thus, the tightening loads applied to respective positions of the separator 28 can be determined individually. It is possible to apply the load preferentially to position where the sealing function is required.

In the first embodiment, the tightening means 95 for applying the tightening load to the electrolyte electrode assemblies 26 and the separators 28 in the stacking direction indicated by the arrow A is provided on opposite sides of the fuel gas supply passage 36 and on opposite sides of the oxygen-containing gas supply passage 50. Therefore, the load applied to the positions near the fuel gas supply passage 36 and the oxygen-containing gas supply passage 50 is higher than the load applied to the electrolyte electrode assemblies 26. Thus, the sealing performance at the fuel gas supply passage 36 and the oxygen-containing gas supply passage 50 is improved, and the contact resistances of the current collectors of the electrolyte electrode assemblies 26 are reduced.

As described above, in the first embodiment, with the simple structure, the sealing performance is improved desirably. Further, since no excessive load is applied to the electrolyte electrode assemblies 26, the damage of the electrolyte electrode assemblies 26 is prevented. For example, the insulating seals 89a, 89b are made of mica material, or ceramic material. Therefore, the insulating seals 89a, 89b are fabricated at low cost.

Figure 10:
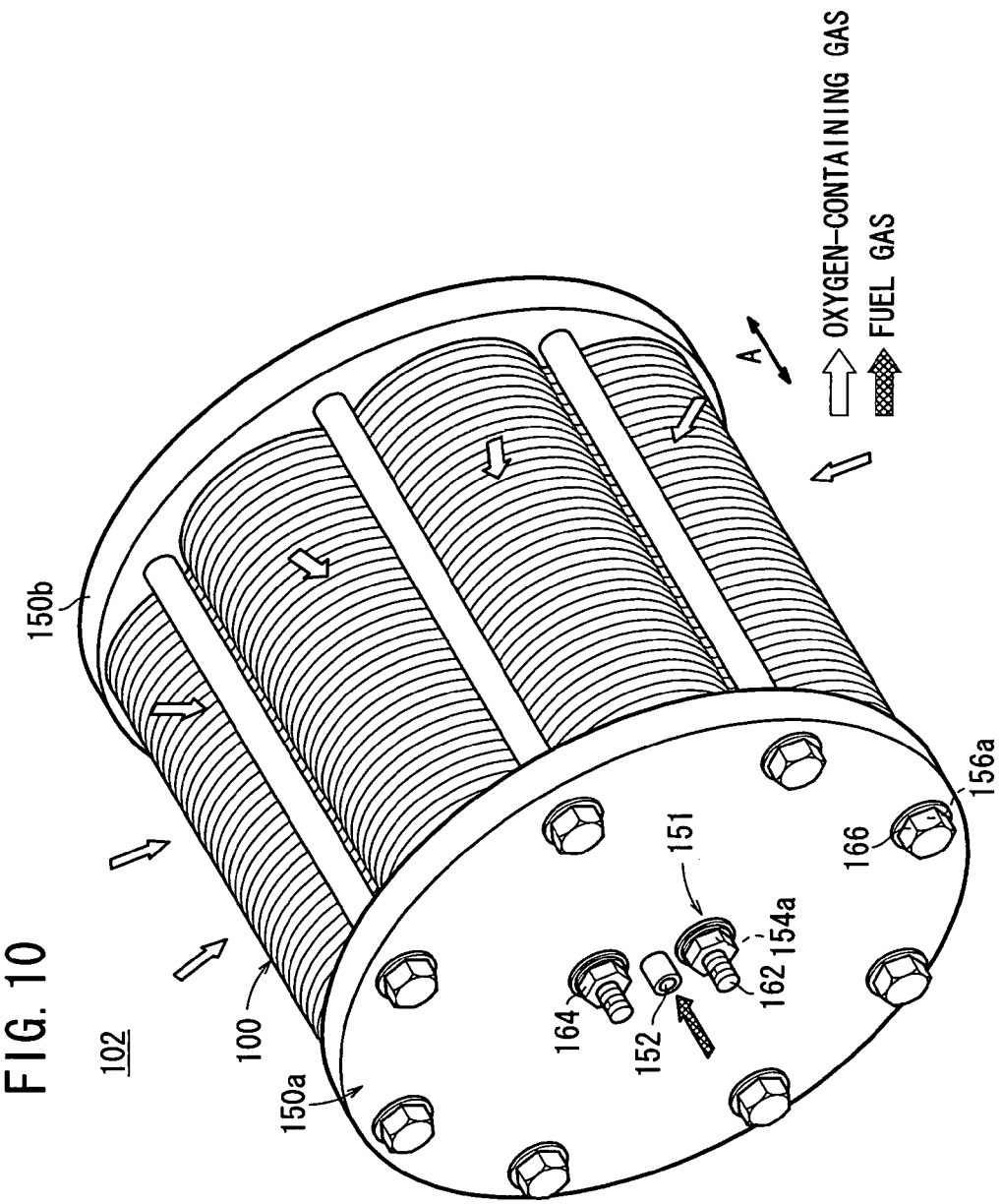
FIG. 10 is a perspective view schematically showing a fuel cell stack formed by stacking a plurality of fuel cells according to a second embodiment of the present invention.
Figure 11:
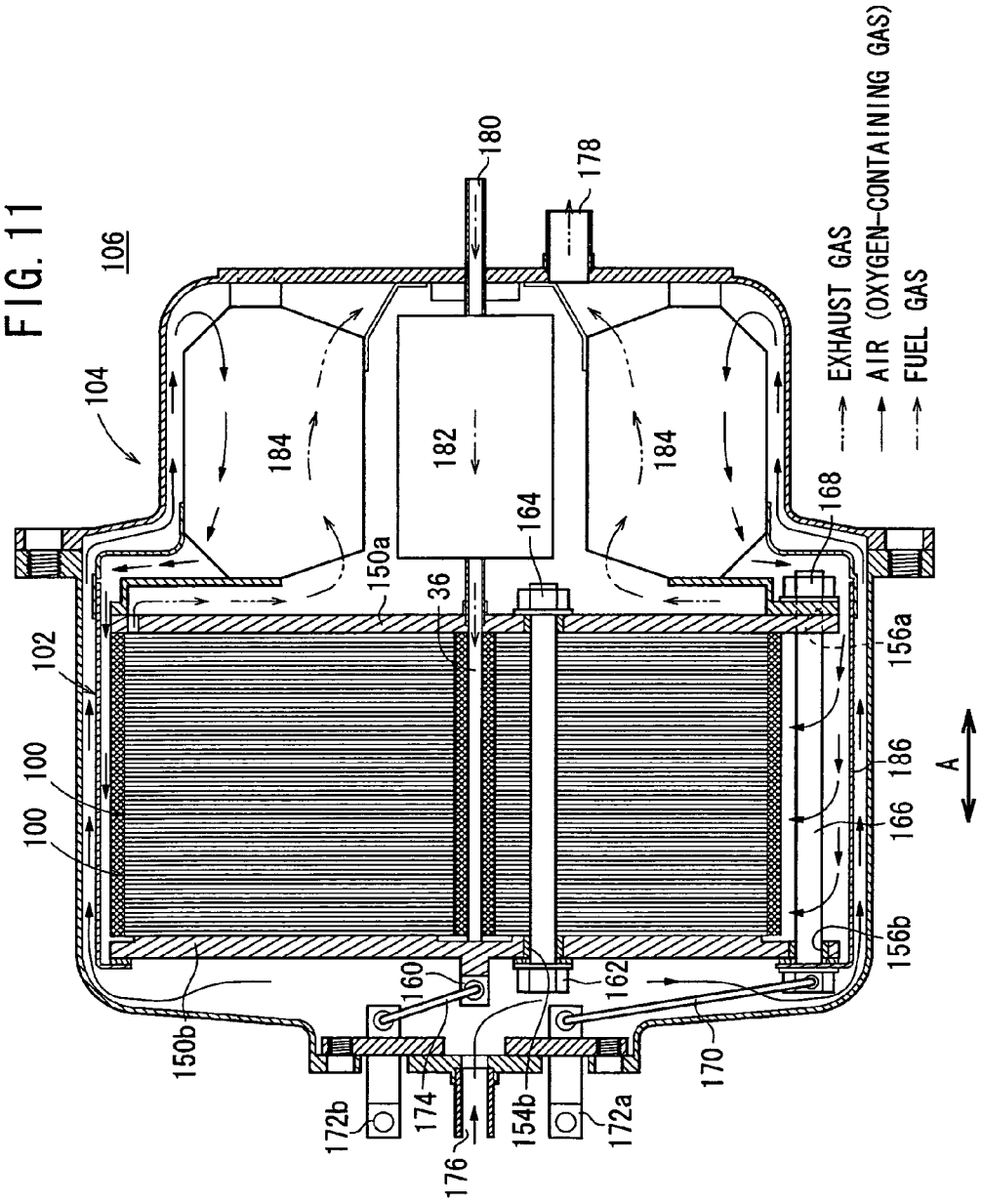
FIG. 11 is a cross sectional view showing part of a fuel cell system in which the fuel cell stack is disposed in a casing.

FIG. 10 is a perspective view schematically showing a fuel cell stack 102 formed by stacking a plurality of fuel cells 100 according to a second embodiment of the present invention in a direction indicated by an arrow A. FIG. 11 is a cross sectional view showing part of a fuel cell system 106 in which the fuel cell stack 102 is disposed in a casing 104.

The constituent elements that are identical to those of the fuel cell 10 according to the first embodiment are labeled with the same reference numeral, and description thereof will be omitted. In a third embodiment as described later, the constituent elements that are identical to those of the fuel cell 10 according to the first embodiment are labeled with the same reference numeral, and description thereof will be omitted.

Figure 12:
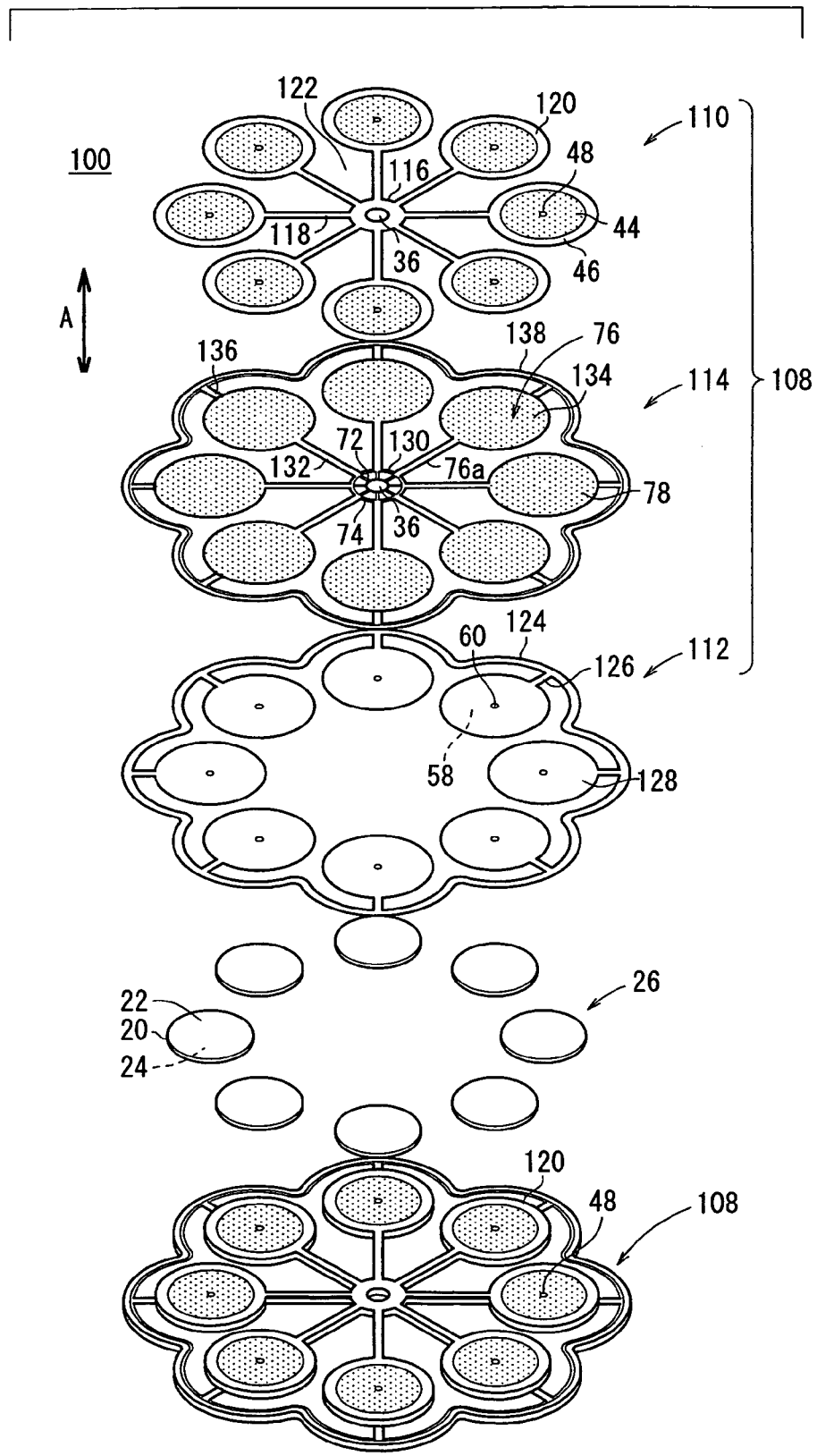
FIG. 12 is an exploded perspective view showing separators of the fuel cell.
Figure 13:
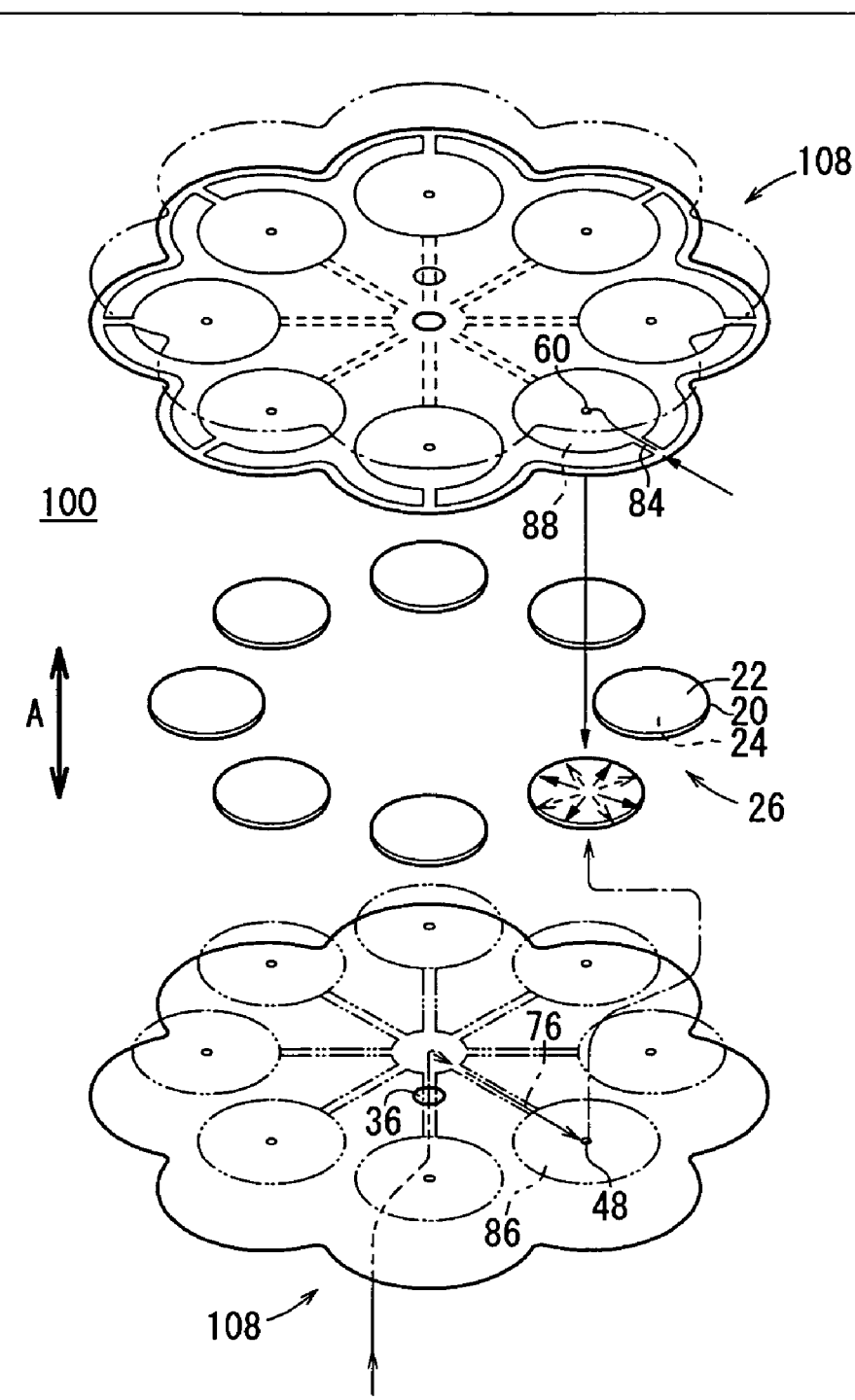
FIG. 13 is a partial exploded perspective view showing gas flows of the fuel cell.

As shown in FIGS. 12 and 13, a plurality of, e.g., eight electrolyte electrode assemblies 26 are interposed between a pair of separators 108 to form the fuel cell 100. The electrolyte electrode assemblies 26 are concentric with a fuel gas supply passage 36 extending through the center of the separators 108.

Each of the separators 108 includes first and second plates 110, 112 which are stacked together, and a third plate 114 interposed between the first and second plates 110, 112. The first through third plates 110, 112, and 114 are metal plates of, e.g., stainless alloy.

The first plate 110 has a first small diameter end portion (a fuel gas supply unit) 116. The fuel gas supply passage 36 extends through the center of the first small diameter end portion 116. The first small diameter end portion 116 is integral with first circular disks 120 each having a relatively large diameter through a plurality of first bridges 118. The first bridges 118 are extending radially outwardly from the first small diameter end portion 116 at equal angles (intervals). An exhaust gas channel 122 is formed in the area around, and internal from the first circular disks 120.

Each of the first circular disks 120 has a plurality of first protrusions 44 and a substantially ring shaped protrusion 46 on a surface which contacts the anode 24 of the electrolyte electrode assembly 26. A fuel gas inlet 48 is provided at the center of the first circular disk 120.

The second plate 112 has a curved outer section (an oxygen-containing gas supply unit) 124. Respective circular arc portions of the curved outer section 124 are integral with second circular disks 128 each having a relatively large diameter through second bridges 126 extending internally from the circular arc portions. As with the first circular disks 120 of the first plate 110, the number of the second circular disks 128 is eight, and the second circular disks 128 are provided at equal angles (intervals). Each of the second circular disks 128 has a plurality of second protrusions 58 on a surface which contacts the cathode 22 of the electrolyte electrode assembly 26. An oxygen-containing gas inlet 60 is provided at the center in each of the second circular disks 128.

The third plate 114 has a second small diameter end portion (the fuel gas supply unit) 130. The fuel gas supply passage 36 extends through the center of the second small diameter end portion 130. Eight first bridges 132 extend radially from the second small diameter end portion 130, and tip ends of the first bridges 132 are integral with third circular disks 134 each having a relative large diameter. Second bridges 136 are provided on extension lines of (in alignment with) the first bridges 132. All the second bridges 136 are integral with a curved outer section (the oxygen-containing gas supply unit) 138 of the third plate 114.

A plurality of third protrusions 78 are formed on the entire surface of the third circular disk 134 facing the first plate 110. Slits 72 and a recess 74 are formed on the second small diameter end portion 130. Further, a fuel gas distribution passage 76a as part of a fuel gas channel 76 is formed in each of the first bridges 132.

Figure 14:
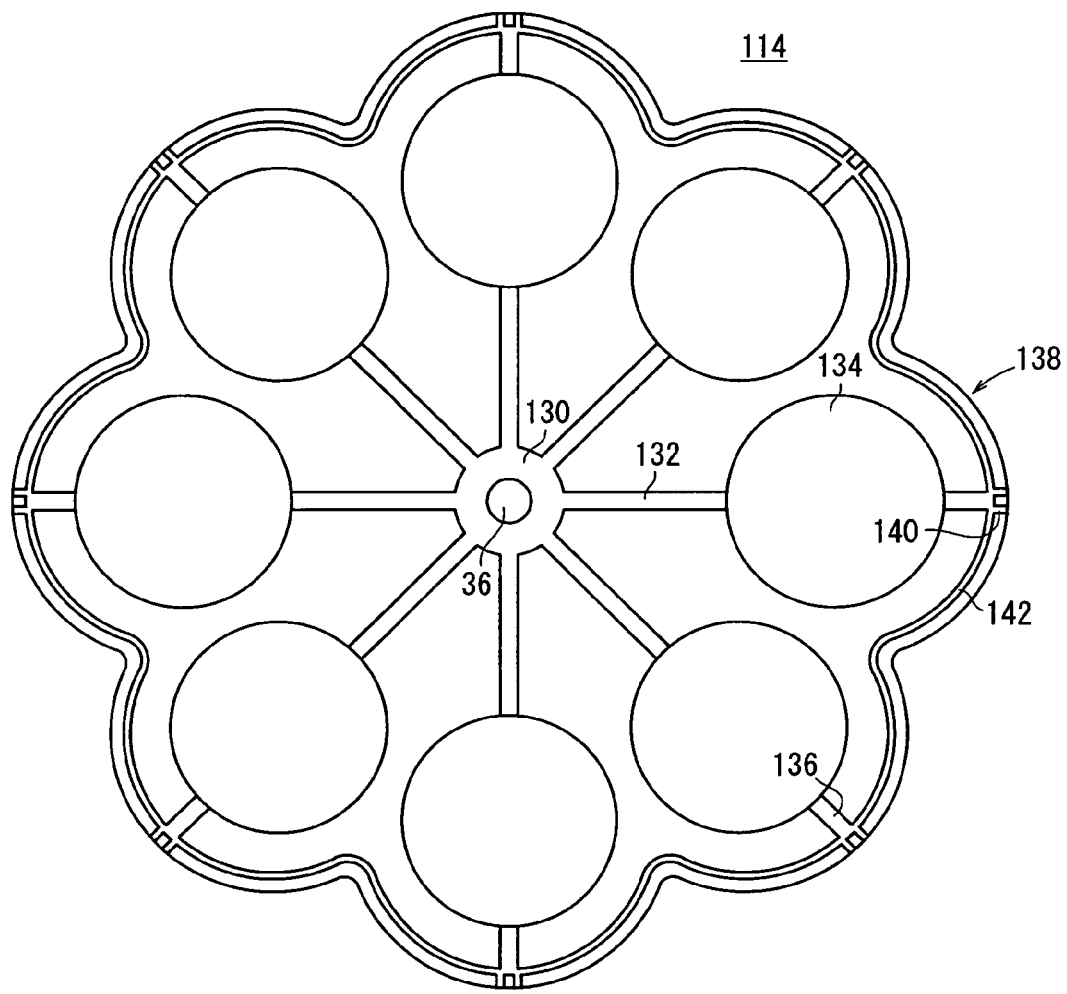
FIG. 14 is a view showing one surface of a third plate of the separator.

As shown in FIG. 14, the curved outer section 138 of the third plate 114 has a plurality of slits (the oxygen-containing gas supply unit) 140 as air intake passages at positions corresponding to the respective third circular disks 134, on a surface facing the second plate 112. Further, a recess 142 for preventing the flow of brazing material is formed along the profile of the curved outer section 138.

Figure 15:
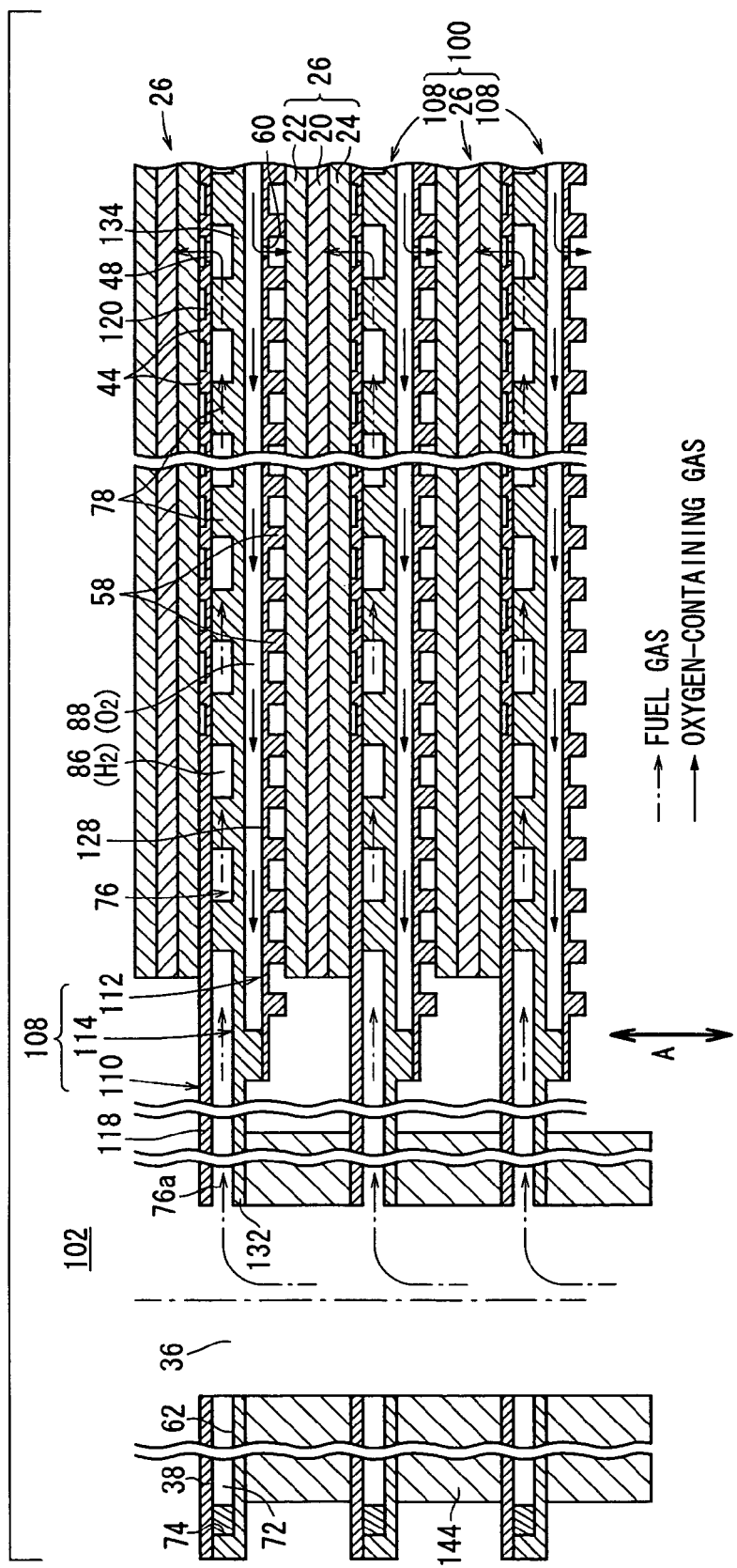
FIG. 15 is an enlarged cross sectional view showing a central region of the fuel cell.

As shown in FIG. 15, when the first plate 110 is jointed to the third plate 114 by brazing, the respective first bridges 118, 132 are joined together to form fuel gas channel members. Fuel gas distribution passages 76a as part of the fuel gas channel 76 are formed in the fuel gas channel members. The fuel gas channel 76 forms a fuel gas pressure chamber 86 between the first and third circular disks 120, 134.

Figure 16:
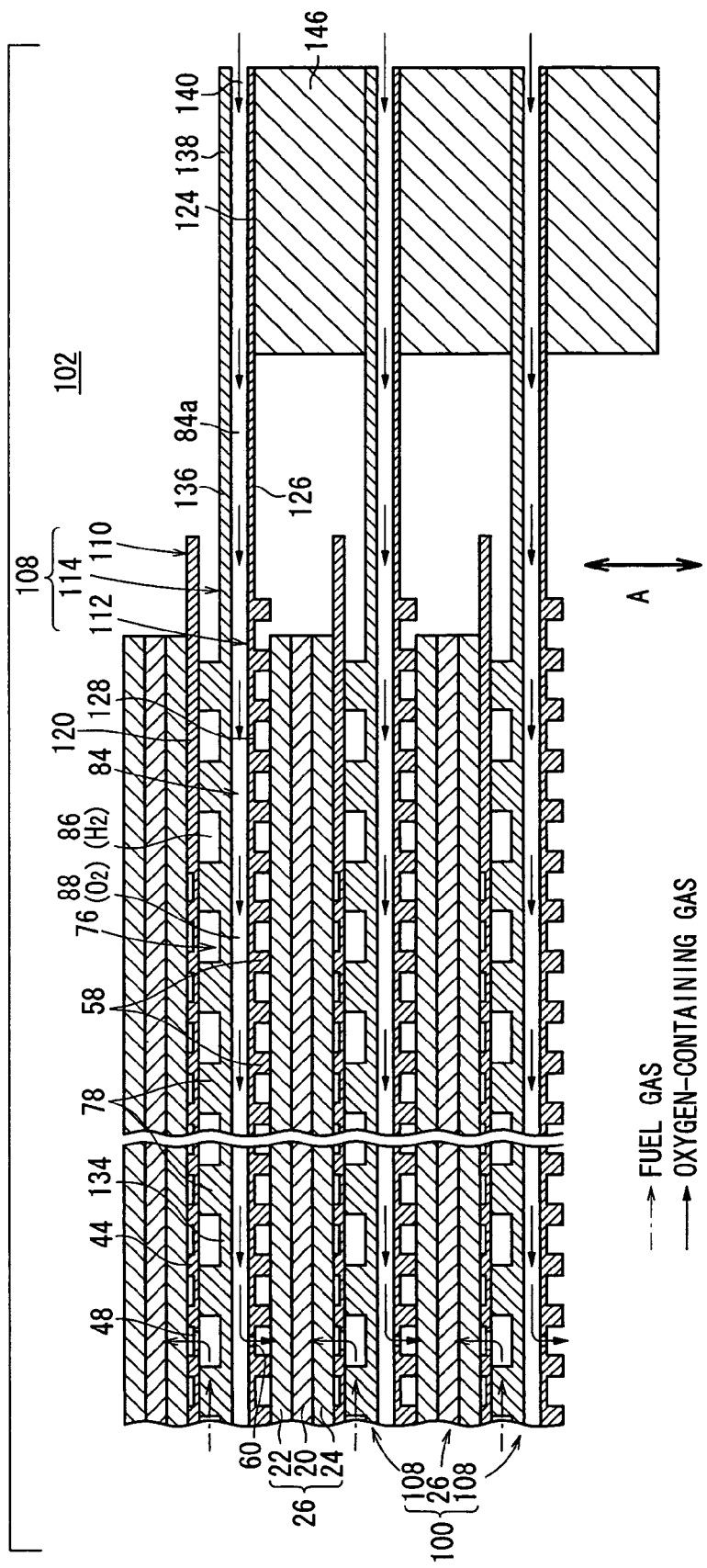
FIG. 16 is an enlarged cross sectional view showing an outer circumferential region of the fuel cell.

As shown in FIG. 16, when the second plate 112 is jointed to the third plate 114 by brazing, the respective second bridges 126, 136 are joined together to form oxygen-containing gas channel members. Oxygen-containing gas distribution passages 84a as part of oxygen-containing gas channel 84 are formed in the oxygen-containing gas channel members. The oxygen-containing gas channel 84 forms an oxygen-containing gas pressure chamber 88 between the second and third circular disks 128, 134.

As shown in FIG. 15, insulating seals 144 for sealing the fuel gas supply passage 36 are provided between the separators 108. Further, as shown in FIG. 16, insulating seals 146 are provided between the curved outer sections 124, 138. For example, the insulating seals 144, 146 are made of mica material, or ceramic material.

As shown in FIGS. 10 and 11, the fuel cell stack 102 includes circular disk shaped end plates 150a, 150b provided at opposite ends of the fuel cells 100 in the stacking direction. The end plate 150a is insulated, and a fuel gas supply port 152 is formed at the center of the end plate 150a. The fuel gas supply port 152 is connected to the fuel gas supply passage 36 extending through each of the fuel cells 100.

Each of the end plates 150a, 150b has tightening means 151 at positions near the fuel gas supply passage 36 for applying a tightening load to the electrolyte electrode assemblies 26 and separators 108 stacked in the direction indicated by the arrow A.

The tightening means 151 includes two bolt insertion holes 154a and eight bolt insertion holes 156a of the end plate 150a. The fuel gas supply port 152 (fuel gas supply passage 36) is positioned between the bolt insertion holes 154a. The eight bolt insertion holes 156a are provided near outer positions of the curved outer sections 124, 138. The bolt insertion holes 154a are provided in the exhaust gas channel 122 of the fuel cell stack 102.

The end plate 150b is made of electrically conductive material. As shown in FIG. 11, the end plate 150b has a connection terminal 160. The connection terminal 160 axially extends from the central region of the end plate 150b. Further, the end plate 150b has two bolt insertion holes 154b. The connection terminal 160 is positioned between the bolt insertion holes 154b. The bolt insertion holes 154a are in alignment with the bolt insertion holes 154b. Two bolts 162 are inserted through the bolt insertion holes 154a, 154b, and tip ends of the bolts 162 are screwed into nuts 164. The bolts 162 are electrically insulated from the end plate 150b.

Further, the end plate 150b has eight bolt insertion holes 156b in alignment with the bolt insertion holes 156a of the end plate 150a. Bolts 166 are inserted into the respective bolt insertion holes 156a, 156b, and tip ends of the bolts 166 are screwed into nuts 168. The bolts 166 are electrically insulated from the end plate 150b. Heads of the bolts 166 are connected electrically to an output terminal 172a through conductive wires 170, and the connection terminal 160 is electrically connected to an output terminal 172a through a conductive wire 174.

The output terminals 172a, 172b are arranged in parallel, and are adjacent to each other. The output terminals 172a, 172b are fixed to the casing 104. The casing 104 has an air supply port 176 positioned between the output terminals 172a, 172b. Further, an exhaust gas port 178 is provided on the other end of the casing 104. A fuel gas supply port 180 is provided adjacent to the exhaust gas port 178. The fuel gas supply port 180 is connected to the fuel gas supply passage 36 through a reformer 182 as necessary. A heat exchanger 184 is provided around the reformer 182. A dual structure section 186 is provided in the casing 104, and the fuel cell stack 102 is disposed in the dual structure section 186.

Operation of the fuel cell stack 102 will be described below.

As shown in FIG. 12, in assembling the fuel cell 100, firstly, the first plate 110 and the second plate 112 are joined to both surfaces of the third plate 114 of the separator 108, e.g., by brazing. Further, the ring shaped insulating seal 144 is provided on the first plate 110 or the third plate 114 around the fuel gas supply passage 36 by brazing (see FIG. 15). Further, the curved insulating seal 146 is provided on the curved outer section 124 of the second plate 112 or the curved outer section 138 of the third plate 114 (see FIG. 16).

In this manner, the separator 108 is fabricated. The third plate 114 divides a space between the first and second plates 110, 112 to form the fuel gas channel 76 and the oxygen-containing gas channel 84 (see FIG. 17). Further, the fuel gas channel 76 is connected to the fuel gas supply passage 36 through the fuel gas distribution passage 76a, and the oxygen-containing gas channel 84 is open to the outside through the slits 140. The oxygen-containing gas is supplied through the slits 140 to the oxygen-containing gas channel 84.

Then, the eight electrolyte electrode assembles 26 are sandwiched between the separators 108. As shown in FIG. 12, the electrolyte electrode assemblies 26 are placed between the separators 108, i.e., between the first circular disks 120 of one separator 108 and the second circular disks 128 of the other separator 108. The fuel gas inlet 48 is positioned at the center in each of the anodes 24, and the oxygen-containing gas inlet 60 is positioned at the center in each of the cathodes 22.

The fuel cells 100 as assembled above are stacked in the direction indicated by the arrow A, and tightened together between the end plates 150a, 150b by tightening means 151 to form the fuel cell stack 102 (see FIG. 10). As shown in FIG. 11, the fuel cell stack 102 is mounted in the casing 104.

Then, the fuel gas is supplied into the fuel gas supply port 180 of the casing 104, and the air is supplied into the air supply port 176 of the casing 104.

The fuel gas flows through the reformer 182 as necessary, and supplied into the fuel gas supply passage 36 of the fuel cell stack 102. The fuel gas flows in the stacking direction indicated by the arrow A, and flows through the fuel gas distribution passages 76a in the separator 108 of each fuel cell 100 (see FIG. 15).

Figure 17:
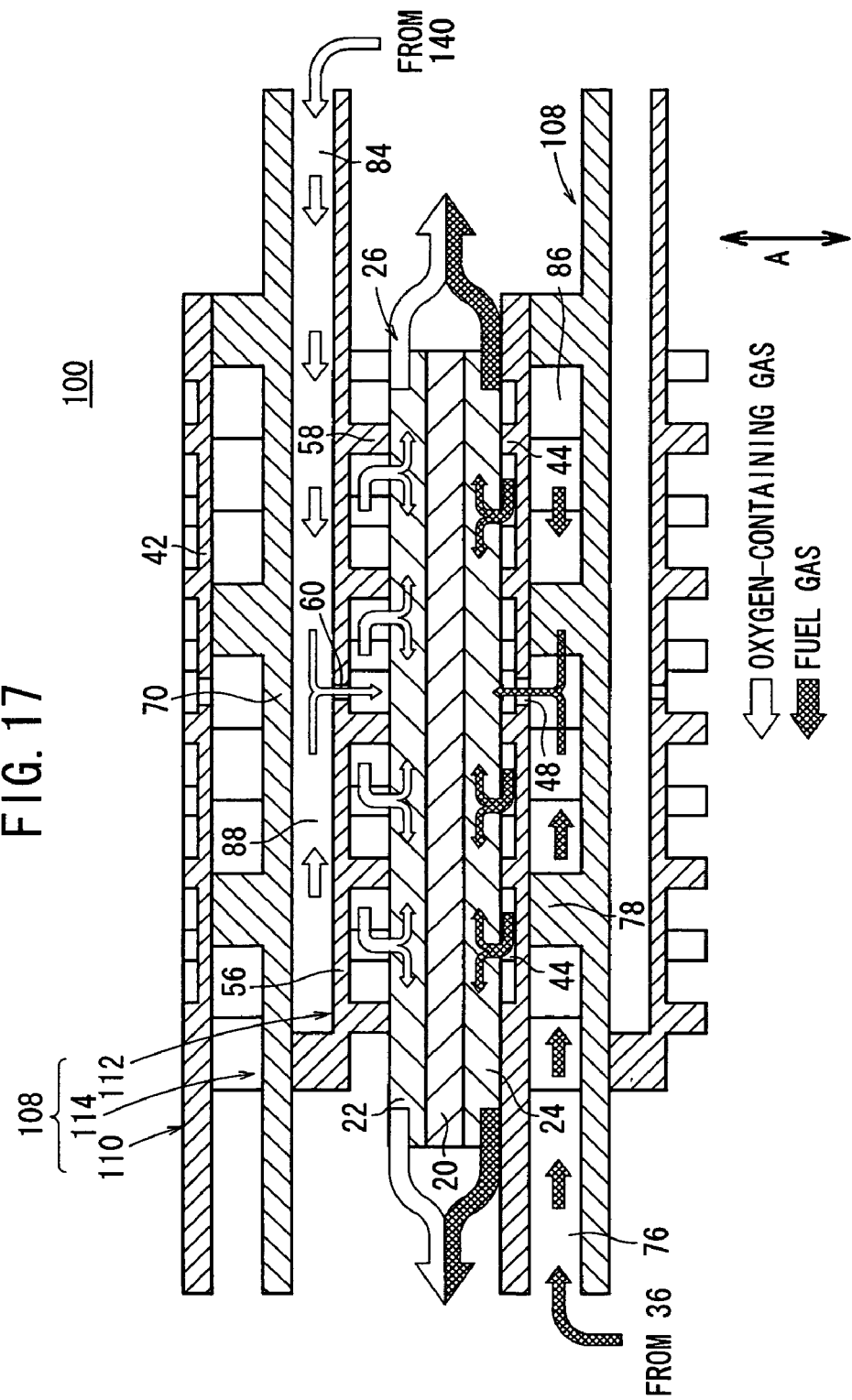
FIG. 17 is a cross sectional view schematically showing operation of the fuel cell.

The fuel gas flows along the fuel gas distribution passage 76a into the fuel gas pressure chamber 86. When the fuel gas flows through the small opening of the fuel gas inlet 48, the internal pressure in the fuel gas pressure chamber 86 is increased. As shown in FIG. 17, the fuel gas from the fuel gas inlet 48 flows toward the central region of the anode 24 of the electrolyte electrode assembly 26. The fuel gas flows from the central region of the anode 24 to the outer circumferential region of the anode 24.

The oxygen-containing gas is supplied from the outer circumferential region in each of the fuel cell 100. The oxygen-containing gas flows through the slits 140 formed in the outer circumferential region in each of the separator 108, and is supplied to the oxygen-containing gas channel 84 (see FIG. 16). The oxygen-containing gas supplied to the oxygen-containing gas channel 84 flows into the oxygen-containing gas pressure chamber 88. When the oxygen-containing gas flows into the small opening of the oxygen-containing gas inlet 60, the internal pressure of the oxygen-containing gas in the oxygen-containing gas pressure chamber 88 is increased. The oxygen-containing gas from the oxygen-containing gas inlet 60 flows toward the central region of the cathode 22. The oxygen-containing gas flows from the central region of the cathode 22 to the outer circumferential region of the cathode 22 (see FIG. 17).

Therefore, in the electrolyte electrode assembly 26, the fuel gas is supplied from the central region to the outer circumferential region of the anode 24, and the oxygen-containing gas is supplied from the central region to the outer circumferential region of the cathode 22 (see FIG. 17). At this time, oxygen ions flow toward the anode 24 through the electrolyte 20 for generating electricity by the chemical reactions.

The fuel cells 100 are connected in series in the stacking direction indicated by the arrow A. As shown in FIG. 11, one of the poles is connected from the connection terminal 160 of the electrically conductive end plate 150b to the output terminal 172b through the conductive wire 174. The other pole is connected from the bolts 166 to the output terminal 172a through the conductive wires 170. Thus, the electric energy can be collected from the output terminals 172a, 172b.

After the fuel gas and the oxygen-containing gas are consumed in the reactions, the fuel gas and the oxygen-containing gas flow toward the outer circumferential regions in each of the electrolyte electrode assembly 26, and are mixed together. The mixed gas flows as an exhaust gas into the exhaust gas channel 122 extending through the separators 108, and flows in the stacking direction. Then, the exhaust gas is discharged to the outside of the casing 104 from the exhaust gas port 178.

In the second embodiment, the fuel gas supply passage 36 and the fuel gas channel 76 of the separator 108 are connected by the narrow first bridges 118, 132, and the slit 140 as an oxygen-containing gas supply unit and the oxygen-containing gas channel 84 of the separator 108 are connected by the narrow second bridges 126, 136.

Since the rigidity of the fuel gas supply unit, the rigidity of the electrode stack unit, and the rigidity of the oxygen-containing gas supply unit are separated by the bridges, the tightening loads applied to the respective positions of the separator 108 can be determined individually. With the simple and economical structure, sealing performance is improved desirably, and no excessive load is applied to the electrolyte electrode assemblies 26. Therefore, the same advantages as with the first embodiment can be obtained. For example, the damage of the electrolyte electrode assemblies 26 is prevented effectively.

Further, the exhaust gas channel 122 is formed around the respective electrolyte electrode assemblies 26 in the separator 108. Thus, the heat of the exhaust gas discharged into the exhaust gas channel 122 is utilized to warm the electrolyte electrode assemblies 26. Thus, improvement in the thermal efficiency is achieved easily.

Figure 18:
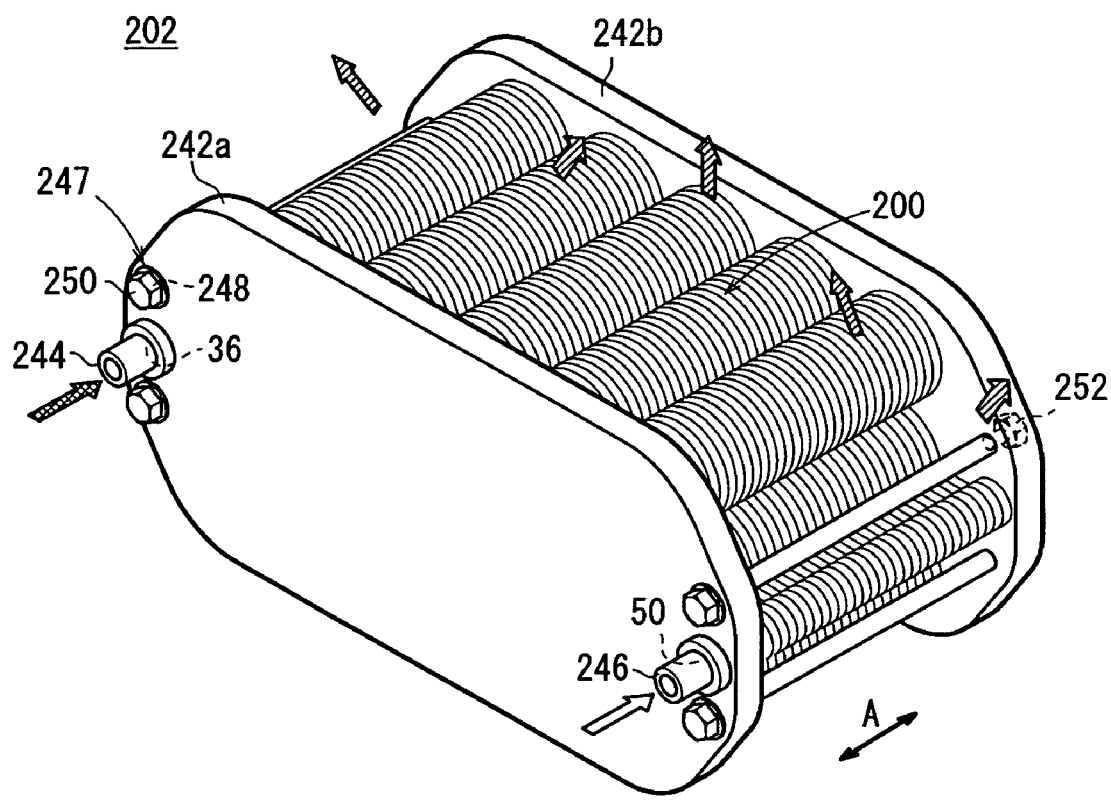
FIG. 18 is a perspective view schematically showing a fuel cell stack formed by stacking a plurality of fuel cells according to a third embodiment of the present invention.
Figure 19:
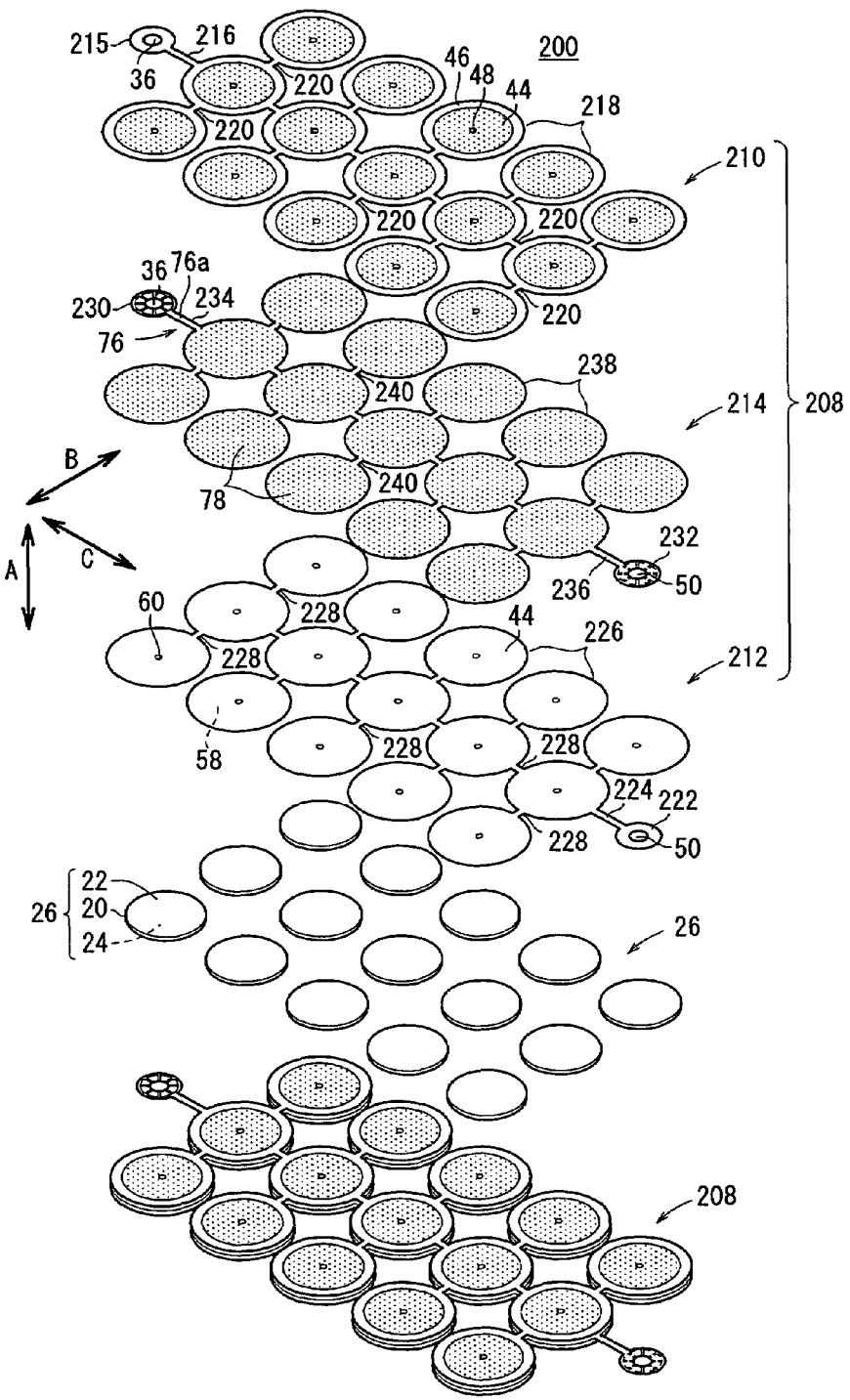
FIG. 19 is an exploded perspective view showing the fuel cell.

FIG. 18 is a perspective view schematically showing a fuel cell stack 202 formed by stacking a plurality of fuel cells 200 according to a third embodiment of the present invention in a direction indicated by an arrow A. FIG. 19 is an exploded perspective view showing the fuel cell 200.

The fuel cell 200 includes a plurality of, e.g., fifteen electrolyte electrode assemblies 26 between a pair of separators 208. Each of the separators 208 includes first and second plates 210, 212 which are stacked together, and a third plate 214 interposed between the first and second plates 210, 212. The first through third plates 210, 212, and 214 are metal plates of, e.g., stainless alloy.

The first plate 210 has a first small diameter end portion (a fuel gas supply unit) 215. The fuel gas supply passage 36 extends through the first small diameter end portion 215. The first small diameter end portion 215 is integral with first circular disks 218 through a narrow first bridge 216. The first circular disks 218 are arranged in directions perpendicular to the stacking direction indicated by the arrow A. Three first circular disks 218 are arranged in a direction indicated by an arrow B, and five first circular disks 218 are arranged in a direction indicated by an arrow C. In total, the number of the first circular disks 218 is 15. The first circular disks 218 are connected by bridges 220.

In the embodiment, the first circular disks 218 at opposite ends in the direction indicated by the arrow B are connected to the first circular disk 218 provided at the central position indicated by the arrow B only by the bridges 220. Alternatively, the adjacent first circular disks 218 may be connected with each other in the direction indicated by the arrow C by the bridges 220.

Each of the first circular disks 218 has a plurality of first protrusions 44 and a substantially ring shape protrusion 46 on a surface facing the electrolyte electrode assembly 26. A fuel gas inlet 48 is provided at the center in the surface of the first circular disk 218.

The second plate 212 has a second small diameter end portion (an oxygen-containing gas supply unit) 222. The oxygen-containing gas supply passage 50 extends through the second small diameter end portion 222. The second small diameter end portion 222 is integral with second circular disks 226 through a narrow second bridge 224.

The second circular disks 226 are connected by bridges 228. As with the first circular disks 218, the second circular disks 226 are arranged in directions perpendicular to the stacking direction indicated by the arrow A. Three second circular disks 226 are arranged in the direction indicated by the arrow B, and five second circular disks 226 are arranged in the direction indicated by the arrow C. In total, the number of the second circular disks 226 is 15. Each of the second circular disks 226 has a plurality of second protrusions 58 on a surface which contacts the cathode 22. An oxygen-containing gas inlet 60 is provided at the center in the surface of the second circular disk 226.

The third plate 214 has a third small diameter end portion (the fuel gas supply unit) 230 and a fourth small diameter end portion (the oxygen-containing gas supply unit) 232. The fuel gas supply passage 36 extends through the third small diameter end portion 230, and the oxygen-containing gas supply passage 50 extends through the fourth small diameter end portion 232. The third circular disks 238 are connected to the third and fourth small diameter end portions 230, 232 through first and second bridges 234, 236.

Three third circular disks 238 are arranged in the direction indicated by the arrow B, and five third circular disks 238 are arranged in the direction indicated by the arrow C. In total, the number of the third circular disks 238 is 15. The third circular disks 238 are connected by bridges 240. Each of the third circular disks 238 has a plurality of third protrusions 78 on its surface facing the first plate 210.

Figure 20:
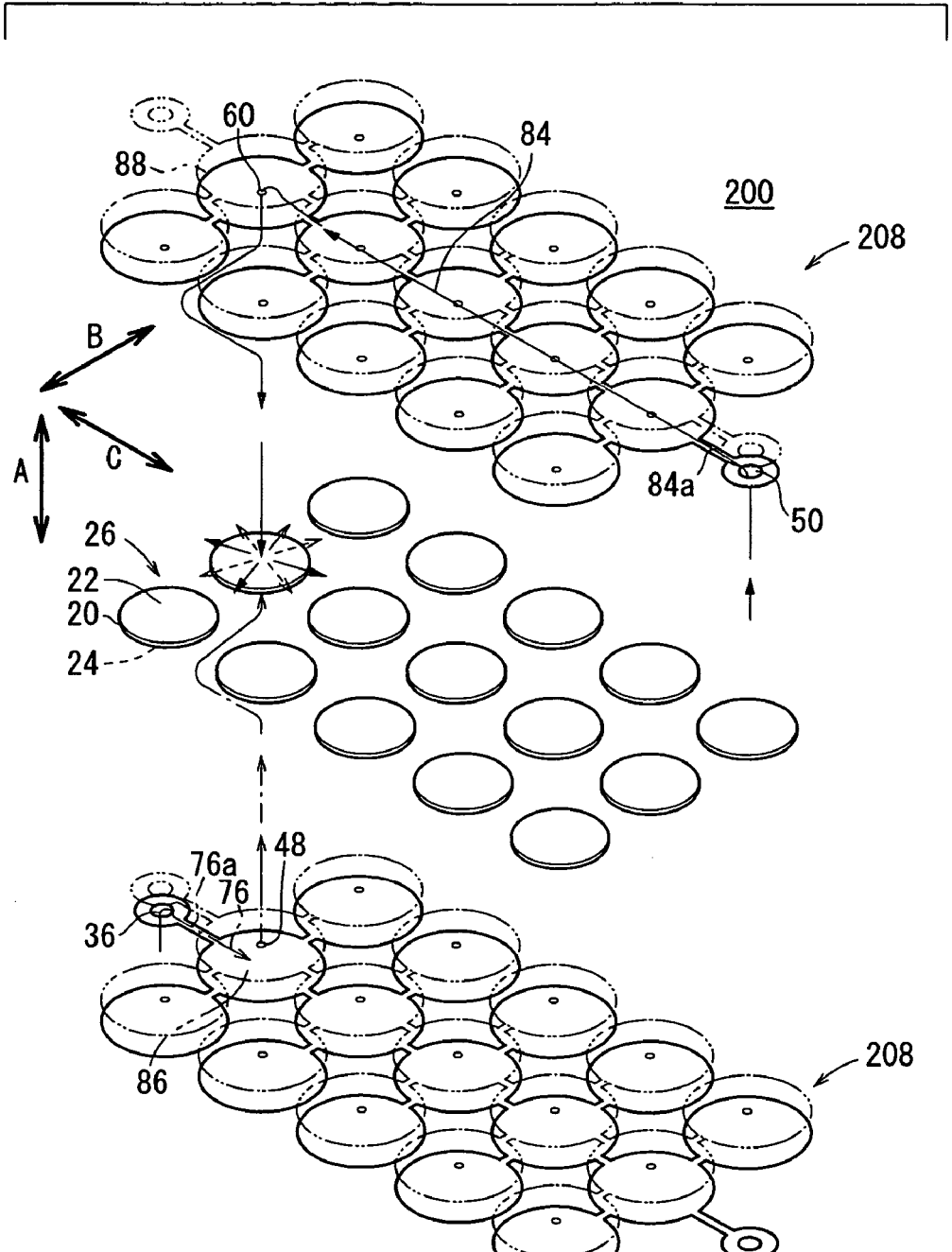
FIG. 20 is an exploded perspective view showing operation of the fuel cell.
Figure 21:
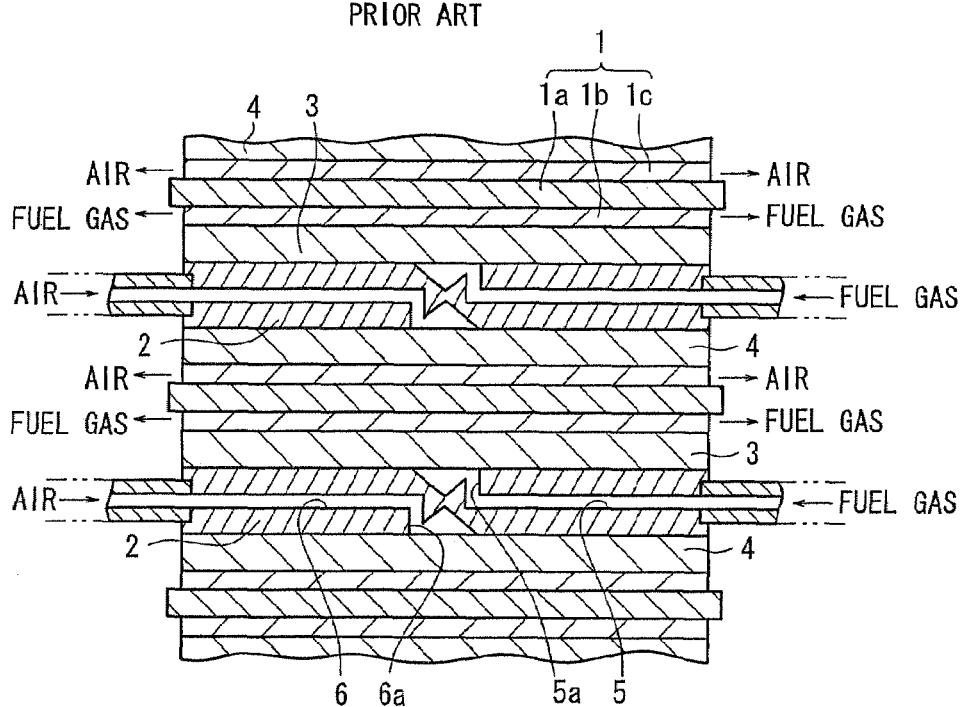
FIG. 21 is a cross sectional view showing a solid oxide fuel cell disclosed in Japanese Laid-Open Patent Publication No. 2002-203579.
Figure 22:
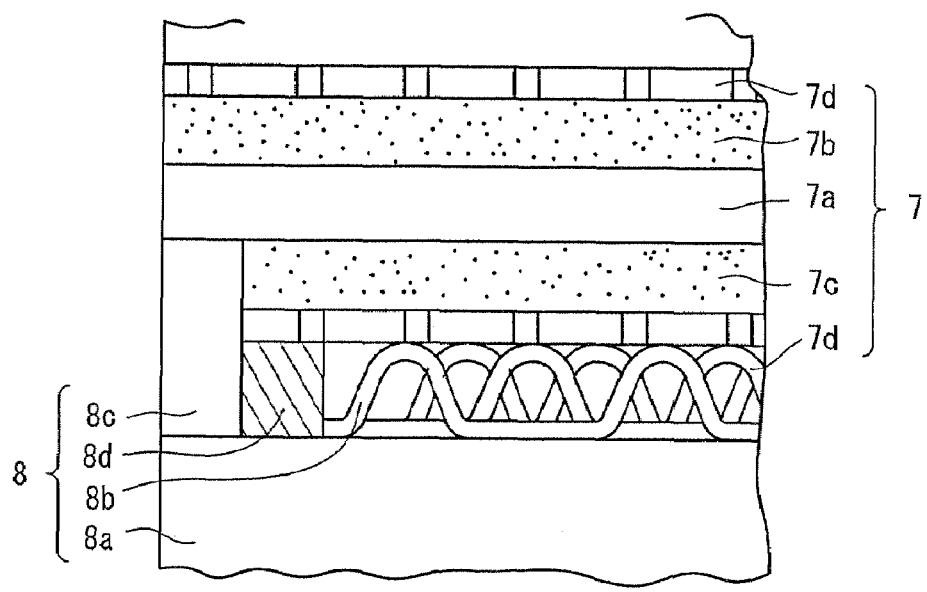
FIG. 22 is a cross sectional view showing a fuel cell disclosed in Japanese Laid-Open Patent Publication No. 10-241707.

The first plate 210 is joined to the third plate 214, e.g., by brazing to form a fuel gas channel 76 between the first plate 210 and the third plate 214. The fuel gas channel 76 includes a fuel gas distribution passage 76a between the first bridges 216, 234, and a fuel gas pressure chamber 86 between the first and third circular disks 218, 238 (see FIG. 20).

The second plate 212 is joined to the third plate 214, e.g., by brazing, to form an oxygen-containing gas channel 84 between the second plate 212 and the third plate 214. The oxygen-containing gas channel 84 includes an oxygen-containing gas distribution passage 84a between the second bridges 224, 236, and an oxygen-containing gas pressure chamber 88 between the second and third circular disks 226, 238 (see FIG. 20).

As shown in FIG. 18, the fuel cell stack 202 includes substantially rectangular end plates 242a, 242b provided at opposite ends of the fuel cells 200 in the stacking direction. A first pipe 244 and a second pipe 246 extend through the end plate 242a. The first pipe 244 is connected to the fuel gas supply passage 36, and the second pipe 246 is connected to the oxygen-containing gas supply passage 50. The end plates 242a, 242b have tightening means 247 at positions near the fuel gas supply passage 36 and the oxygen-containing gas supply passage 50 for applying a tightening load to the electrolyte electrode assemblies 26 and the separators 208 in the stacking direction. The electrolyte electrode assemblies 26 and the separators 208 are stacked in the direction indicated by the arrow A.

The tightening means 247 includes the bolt insertion holes 248 of the end plates 242a, 242b. The fuel gas supply passage 36 and the oxygen-containing gas supply passage 50 are positioned between the bolt insertion holes 248, respectively. The end plate 242a or the end plate 242b is electrically insulated from tightening bolts 250. The tightening bolts 250 are inserted into the bolt insertion holes 248, and tip ends of the tightening bolts 250 are screwed into nuts 252 to tighten the fuel cells 200 of the fuel cell stack 202 together.

In the third embodiment, the fuel gas supply passage 36, the fuel gas channel 76, the oxygen-containing gas supply passage 50 and the oxygen-containing gas channel 84 of the separator 208, are connected by the narrow first bridges 216, 234 and the second bridges 224, 236, respectively.

In the separator 208, since the rigidity of the fuel gas supply unit, the rigidity of the electrode stack unit, and the rigidity of the oxygen-containing gas supply unit are separated by the bridges, the tightening loads applied to the respective positions of the separator 208 can be determined individually. With the simple and economical structure, sealing performance is improved desirably, and no excessive load is applied to the electrolyte electrode assemblies 26. Therefore, the same advantages as with the first and second embodiments can be obtained. For example, the damage of the electrolyte electrode assemblies 26 is prevented effectively.

The invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking an electrolyte electrode assembly and separators alternately, said electrolyte electrode assembly including an anode, a cathode, and an electrolyte interposed between said anode and said cathode, wherein
a fuel gas flow field for supplying a fuel gas along a surface of said anode, and an oxygen-containing gas flow field for supplying an oxygen-containing gas along a surface of said cathode are provided,
each said separator comprising:
first and second plates which are stacked together, and a third plate interposed between said first and second plates;
wherein said first plate includes a central plate portion, and an outwardly extending and integrally formed bridge portion,
wherein said second plate includes a central plate portion, and an outwardly extending and integrally formed bridge portion,
wherein said third plate includes a central plate portion, and first and second outwardly extending and integrally formed bridge portions,
wherein the central plate portions of the first plate, the second plate and the third plate are substantially the same size, and
wherein the first plate lies in a first plane, the second plate lies in a second plane separate and distinct from the first plane, and the third plate lies in a third plane separate and distinct from the first and second planes,
an electrode stack unit on which said electrolyte electrode assembly is stacked, the central plate portions of said first, second and third plates making up the electrode stack unit;
a fuel gas supply unit for allowing said fuel gas to flow into a surface of said separator;
a fuel gas distribution passage formed between said bridge portion of said first plate and said first bridge portion of said third plate, wherein said bridge portions are narrower than said electrode stack unit, said fuel gas distribution passage connecting said fuel gas flow field and said fuel gas supply unit;
an oxygen-containing gas supply unit for allowing said oxygen-containing gas to flow into a surface of said separator; and
an oxygen-containing gas distribution passage formed between said bridge portion of said second plate and said second bridge portion of said third plate, wherein said bridge portions are narrower than said electrode stack unit, said oxygen-containing gas distribution passage connecting said oxygen-containing gas flow field and said
oxygen-containing gas supply unit,
the fuel cell further comprising:
a fuel gas channel extending along an entire first surface of said central plate portion of said third plate for distributing the fuel gas along the entire first surface of said central plate portion of said third plate;
an oxygen-containing gas channel extending along an entire second surface of said central plate portion of said third plate for distributing said oxygen-containing gas along the entire second surface of said central plate portion of said third plate, the second surface being opposite to the first surface;
wherein tightening means is provided at positions closer to said fuel gas supply unit and said oxygen-containing gas supply unit than said electrode stack unit for individually applying a tightening load to said fuel gas supply unit, said oxygen-containing gas supply unit and said electrolyte electrode assembly in a stacking direction of said electrolyte electrode assembly and said separators.

2. A fuel cell according to claim 1, wherein
said bridge portion of said first plate and said first bridge portion of said third plate connect said electrode stack unit and said fuel gas supply unit to form said fuel gas distribution passage; and
said bridge portion of said second plate and said second bridge portion of said third plate connect said electrode stack unit and said oxygen-containing gas supply unit to form said oxygen-containing gas distribution passage.

3. A fuel cell according to claim 1, wherein said fuel gas supply unit comprises a fuel gas supply passage extending in said stacking direction.

4. A fuel cell stack formed by stacking a plurality of fuel cells, said fuel cells each formed by stacking an electrolyte electrode assembly and separators alternately, said electrolyte electrode assembly including an anode, a cathode, and an electrolyte interposed between said anode and said cathode, wherein
a fuel gas flow field for supplying a fuel gas along a surface of said anode, and an oxygen-containing gas flow field for supplying an oxygen-containing gas along a surface of said cathode are provided,
each said separator comprising:
first and second plates which are stacked together, and a third plate interposed between said first and second plates;
wherein said first plate includes a central plate portion, and an outwardly extending and integrally formed bridge portion,
wherein said second plate includes a central plate portion, and an outwardly extending and integrally formed bridge portion,
wherein said third plate includes a central plate portion, and first and second outwardly extending and integrally formed bridge portions,
wherein the central plate portions of the first plate, the second plate and the third plate are substantially the same size, and
wherein the first plate lies in a first plane, the second plate lies in a second plane separate and distinct from the first plane, and the third plate lies in a third plane separate and distinct from the first and second planes,
an electrode stack unit on which said electrolyte electrode assembly is stacked, the central plate portions of said first, second and third plates making up the electrode stack unit;
a fuel gas supply unit for allowing said fuel gas to flow into a surface of said separator;
a fuel gas distribution passage formed between said bridge portion of said first plate and said first bridge portion of said third plate, wherein said bridge portions are narrower than said electrode stack unit, said fuel gas distribution passage connecting said fuel gas flow field and said fuel gas supply unit;
an oxygen-containing gas supply unit for allowing said oxygen-containing gas to flow into a surface of said separator; and
an oxygen-containing gas distribution passage formed between said bridge portion of said second plate and said second bridge portion of said third plate, wherein said bridge portions are narrower than said electrode stack unit, said oxygen-containing gas distribution passage connecting said oxygen-containing gas flow field and said
oxygen-containing gas supply unit,
the fuel cell stack further comprising:
a fuel gas channel extending along an entire first surface of said central plate portion of said third plate for distributing the fuel gas along the entire first surface of said central plate portion of said third plate;
an oxygen-containing gas channel extending along an entire second surface of said central plate portion of said third plate for distributing said oxygen-containing gas along the entire second surface of said central plate portion of said third plate, the second surface being opposite to the first surface;
wherein tightening means is provided at positions closer to said fuel gas supply unit and said oxygen-containing gas supply unit than said electrode stack unit for individually applying a tightening load to said fuel gas supply unit, said oxygen-containing gas supply unit and said electrolyte electrode assembly in a stacking direction of said electrolyte electrode assembly and said separators.

5. A fuel cell according to claim 1, wherein said fuel gas flow field is formed between said first plate and one electrolyte electrode assembly;
said oxygen-containing gas flow field is formed between said second plate and another electrolyte electrode assembly; and
said fuel gas channel connects said fuel gas supply unit and said fuel gas flow field and said oxygen-containing gas channel connects said oxygen-containing gas supply unit and said oxygen-containing gas flow field.

6. A fuel cell according to claim 1, wherein each of the electrolyte electrode assembly and the electrode stack unit comprises a circular disk shape.

7. A fuel cell according to claim 1, wherein the fuel gas supply unit includes an enclosed recess.

8. A fuel cell according to claim 1, wherein the oxygen gas supply unit includes an enclosed recess.

* * * * *